United States Patent
Iwamura et al.

(10) Patent No.: US 7,055,011 B2
(45) Date of Patent: May 30, 2006

(54) REMOTE COPY NETWORK

(75) Inventors: Takashige Iwamura, Yokohama (JP); Takashi Oeda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 213 days.

(21) Appl. No.: 10/816,572

(22) Filed: Mar. 31, 2004

(65) Prior Publication Data

US 2005/0114730 A1    May 26, 2005

(30) Foreign Application Priority Data

Nov. 26, 2003    (JP) ............................. 2003-394921

(51) Int. Cl.
*G06F 12/00* (2006.01)
(52) U.S. Cl. ............................ 711/162; 714/6; 709/217
(58) Field of Classification Search ...................... None
See application file for complete search history.

(56) References Cited

U.S. PATENT DOCUMENTS

| | | | |
|---|---|---|---|
| 5,734,818 A | 3/1998 | Kern et al. | |
| 5,949,970 A | 9/1999 | Sipple | |
| 6,044,444 A | 3/2000 | Ofek | |
| 6,209,002 B1 | 3/2001 | Gagne et al. | |
| 6,363,462 B1 | 3/2002 | Bergsten | |
| 6,539,462 B1 | 3/2003 | Mikkelsen et al. | |
| 6,601,187 B1 | 7/2003 | Sicola et al. | |
| 6,618,818 B1 | 9/2003 | Wahl et al. | |
| 6,658,540 B1 | 12/2003 | Sicola | |
| 6,665,812 B1 | 12/2003 | Blumenau | |
| 2001/0047460 A1 | 11/2001 | Kobayashi | |
| 2003/0005355 A1 | 1/2003 | Yanai | |
| 2003/0051111 A1 | 3/2003 | Nakano et al. | |
| 2004/0039888 A1 | 2/2004 | LeCrone | |
| 2004/0044865 A1 | 3/2004 | Sicola | |
| 2004/0139124 A1 | 7/2004 | Kawamura | |

FOREIGN PATENT DOCUMENTS

| | | |
|---|---|---|
| EP | 1049016 A2 | 11/2000 |
| JP | 07-244597 | 9/1995 |
| JP | 2000-305856 | 11/2000 |
| JP | 2003-122509 | 4/2003 |

*Primary Examiner*—Kevin Verbrugge
(74) *Attorney, Agent, or Firm*—Townsend and Townsend and Crew LLP

(57) ABSTRACT

A remote copy network realizes low-cost multi-hop remote copying. Remote copying is executed via a remote copy network (RCN) having a source edge device connected to a source storage and a target edge device connected to a target storage. Because the RCN is a network provided by a network business, a user having a storage device can execute remote copying without owning or managing the RCN. The source edge device receives remote copy I/O from the source storage, creates a log entry to which a sequential number is added, and sends the log entry to a target edge device. The target edge device acquires the remote copy I/O from the received log entry, and sends the remote copy I/O to the target storage in the order of the sequential number.

20 Claims, 22 Drawing Sheets

FIG.4
(A)
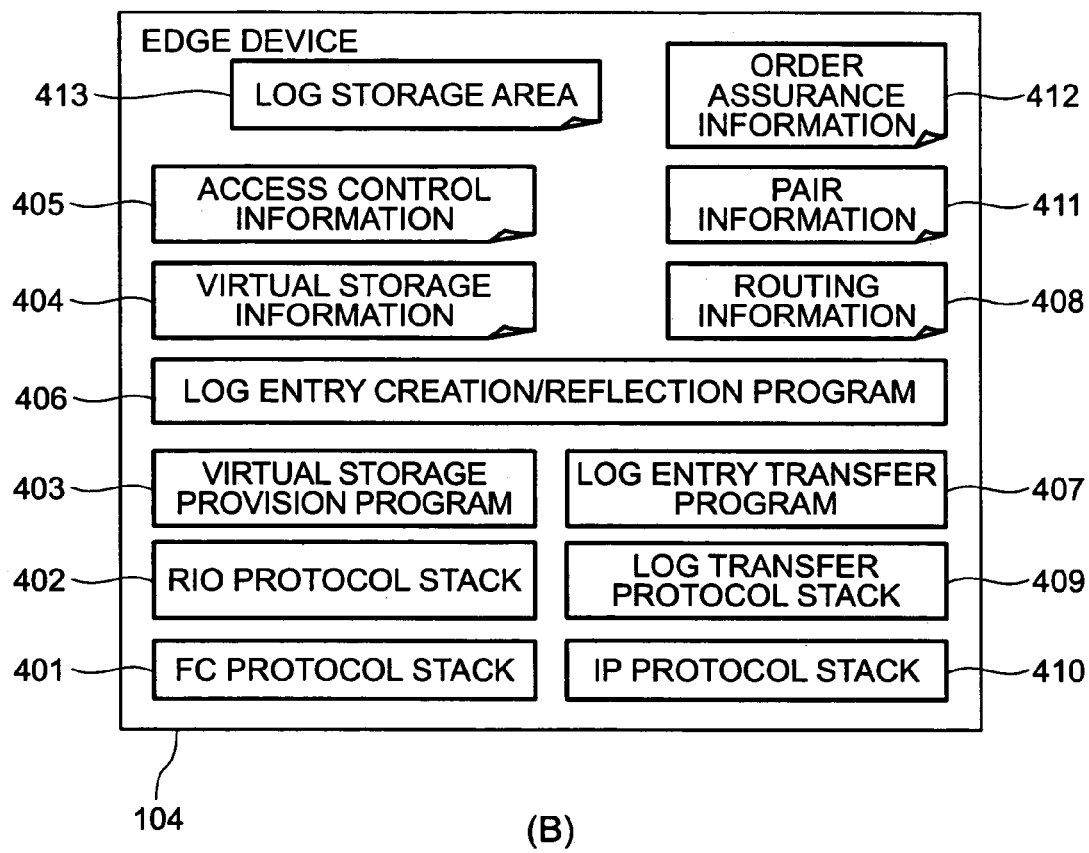
(B)
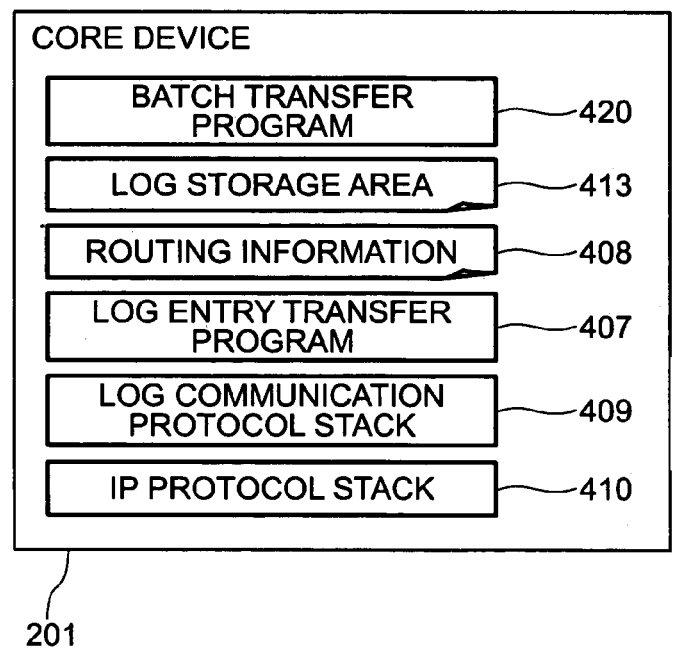

FIG.7

ROUTING INFORMATION — 408

(A)

| SOURCE STORAGE WWN | TARGET STORAGE WWN | ROUTING INFORMATION |
|---|---|---|
| WWN-A | WWN-E | IP1, IP2, IP3 |
| WWN-E | WWN-A | IP3, IP2, IP1 |
| WWN-K | WWN-J | IP4, IP5 |
| WWN-J | WWN-K | IP5, IP4 |

711　712　713

PAIR INFORMATION

(B)

| SOURCE | | TARGET | | PAIR STATE | ORDER ASSURANCE ID | DIFFERENTIAL BITMAP |
|---|---|---|---|---|---|---|
| STORAGE WWN | LUN | STORAGE WWN | LUN | | | |
| WWN-A | 1 | WWN-E | 2 | D | 1 | |
| WWN-A | 2 | WWN-E | 4 | D | 1 | |
| WWN-B | 12 | WWN-C | 23 | S | 2 | |
| WWN-C | 22 | WWN-B | 13 | S | 3 | |

721　722　723　724　725　726　727

411

ORDER ASSURANCE INFORMATION

(C)

| ORDER ASSURANCE ID | LOG CREATION COUNTER VALUE | LOG REFLECTION COUNTER VALUE | LOG DELETION COUNTER VALUE | REFLECTION DELAY TIME |
|---|---|---|---|---|
| 1 | 123 | - | 100 | - |
| 2 | - | 456 | - | 4.00 |
| 3 | 789 | - | 780 | - |
| ... | ... | ... | ... | ... |

731　732　733　734　735

412

REMOTE COPY NETWORK

CROSS-REFERENCES TO RELATED APPLICATIONS

This application relates to and claims priority from Japanese Patent Application No. 2003-394921, filed on Nov. 26, 2003, the entire disclosure of which is incorporated herein by reference.

BACKGROUND OF THE INVENTION

This invention relates to an information processing system comprising storage device, and more specifically, to remote copying and disaster recovery technology, executed by a remote copy network (hereafter also called an "RCN") comprising two or more storage devices and two or more network devices.

When failure occurs in a storage device of an information processing system due to electrical power failure, natural disasters or other disasters, operations using the information processing system are halted temporarily, and in the worst case, data stored in the storage device may be lost. In order to avoid such circumstances, there exists technology (hereafter called "remote copying") through which data stored in storage devices of the information storage system is transferred to and copied in storage devices prepared at a remote location different from the information processing system.

There are two types of remote copying, synchronous remote copying and asynchronous remote copying, and each has advantages and drawbacks. Specifically, in synchronous remote copying, when there is a write request from a computer of the information storage system, after completion of the transfer of data accompanying the write request to a storage device existing at the remote location, a storage device of the information processing system sends a response to the write request to the computer. Hence in synchronous remote copying there is little data loss due to failures, but increased communication line delays between storage devices result in worsened I/O performance between computers and storage devices.

On the other hand, in the asynchronous remote copying described in Japanese Patent Publication No. 3149325, a storage device of an information processing system responds to write requests from computers and transfers data accompanying write requests to the remote location with independent timing. Hence in asynchronous remote copying, even when the distance between storage devices is great, responses can be made to computers prior to the copying of data to the remote location, so that declines in responsiveness to computers tend not to occur. However, in asynchronous remote copying the possibility of data loss is greater than in synchronous remote copying.

In recent years, a multi-hop method which combines synchronous remote copying and asynchronous remote copying has been invented (see Japanese Patent Laid-open No. 2003-122509 and Japanese Patent Laid-open No. 2000-305856).

SUMMARY OF THE INVENTION

Because the methods of both Japanese Patent Laid-open No. 2003-122509 and Japanese Patent Laid-open No. 2000-305856 assume that the owner of the storage devices manages intermediate devices, increases in the costs of device ownership and in management costs are problems. A multi-hop remote copy technology is here disclosed which can suppress increases in the costs of device ownership and in management costs.

Remote copying is executed via a remote copy network (RCN) having source edge devices connected to source storage and target edge devices connected to target storage.

A source edge device receives a remote copy I/O request from source storage, creates a log entry to which a sequential number is assigned, and sends the log entry to a target edge device. The target edge device acquires the remote copy I/O request from the received log entry, and sends, in the order of sequential numbers, remote copy I/O requests to the target storage.

Consequently, device ownership costs and management costs when executing multi-hop remote copying between storage devices can be reduced.

BRIEF DESCRIPTION OF THE DRAWINGS

FIG. 4 shows one example of programs executed by an edge device and core device;

FIG. 7 shows one example of information used by a management server, edge device, and core device;

DESCRIPTION OF THE PREFERRED EMBODIMENTS

Below, aspects of this invention are explained. However, this invention is not limited to the aspects explained below.

Figure 1:
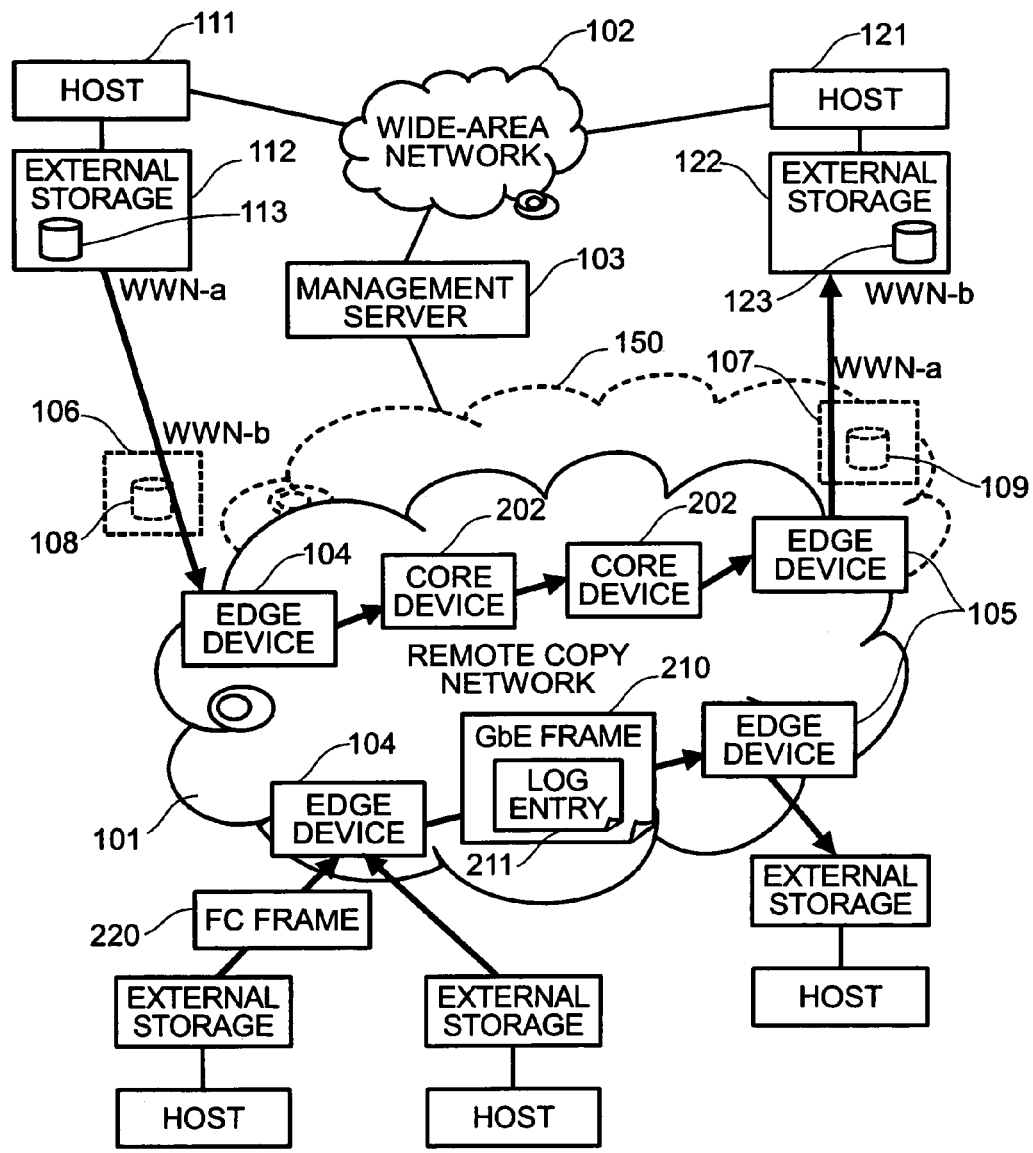
FIG. 1 shows one example of an information processing system in which remote copying is executed.

FIG. 1 shows a general example of an information processing system in one aspect of this invention.

The information processing system comprises a remote copy network 101, wide-area network 102, management server 103, management network 150, host computer (hereafter simply "host") 111 and host 121, external storage 112, and external storage 122. To facilitate the explanation below, the external storage 112 may, as storage having a copy source volume 113 for remote copying, be called source external storage 112, and the external storage 122 may, as storage having a copy destination volume 123, be called target external storage 122. The terms "source" and "target" are used to express the relations between the host 111 and host 121, volume 113 and volume 123, virtual storage 106 and virtual storage 107, and virtual volume 108 and virtual volume 109. These relations are not fixed, and a certain external storage device may serve as both source and target.

The remote copy network 101, wide-area network 102, management network 150, and management server 103 are provided by a network business. Hence in this aspect, a customer having a source-side host and source external storage, and a target-side host and target external storage, can connect the hosts and external storage devices to a remote copy network to execute remote copying via the remote copy network. Consequently a customer can execute multi-hop remote copying without managing or maintaining a remote copy network, so that the device ownership costs and management costs of multi-hop remote copying can be reduced. Moreover, when the RCN business supplier and the customer is same, maintenance and management cost can be reduced from prior-art because the management server 103 manage the RCN)

The host 111 and host 121 are computers on which application programs to perform transaction processing and other operations run; the volume 113 is a volume used by host 111, and the volume 123 is a volume used by host 121.

The remote copy network 101 is a network comprising edge devices 104 and 105, the core device 202, and a plurality of other devices. However, the core device 202 is not essential device for the remote copy network 101. Edge devices and core devices may be a type of router or gateway device. The external storage 112 and external storage 122 are connected via the edge device 104 or edge device 105 to the remote copy network 101. Between the edge device 104 or edge device 105 and the core device 202, remote copy requests and data for remote copying accompanying remote copy requests (hereafter called either "remote copy I/O requests" or "RIO") are transferred in the format of a log entry 211 comprising time order information. Processing to convert an RIO into a log entry is executed by the edge device.

An edge device is a device which is connected to external storage existing outside the remote copy network 101.

A core device 202 is a device which transfers log entries 211, created and transferred by an edge device 104, to another edge device 105 or to a core device 202.

Virtual storage 106 or 107 is virtual storage which is provided by the edge device 104 or the edge device 105, to external storage 112 or 122. An edge device provides, to the external storage to which it is connected, virtual storage which behaves as opposite side external storage paired for remote copying, to display itself as opposite side external storage paired with the external storage for remote copying (for example, the edge device 104 provides to the external storage 112 virtual storage 106 which behaves as the external storage 122; the edge device 105 provides to the external storage 122 virtual storage 107 which behaves as the external storage 112).

Edge devices and core devices 202 are connected by a network not shown. As the mode of connection, the IP protocol on Gigabit Ethernet (a registered trademark; hereafter also called "GbE") is possible, but other network media and protocols may also be used. As the connection of edge devices 104 or 105 with external storage 112 or 122, protocols such as SCSI, iSCSI, iFCP, mFCP, FCIP or similar on Fiber Channel (hereafter also called "FC"), ESCON, FICON, GbE or similar are possible; but other protocols on other network media may also be used. In the following explanation, it is assumed that FC and SCSI are used to connect edge devices to external storage, and that GbE and the IP protocol and UDP protocol are used to connect edge devices and core devices 202; however, the scope of this invention is not limited to these protocols.

An FC frame 220 is a frame for communication between external storage and edge devices via FC; a GbE frame 210 is a frame for communication between edge devices and core devices, or between a plurality of core devices, via GbE; and log entries 211 are transferred using GbE frames 210.

The management server 103 is a computer to configure information needed by the owner (customer) of the external storage 112 and external storage 122 to use the remote copy network and to reference the configuration and state information of the remote copy network 101, and is connected to the wide-area network 102 and management network 150. The host 111 and host 121 use the wide-area network 102 to communicate with the management server 103. The wide-area network 102 may take any form so long as communication between the hosts 111 and 121 and the management server 103 is possible, and may be comprised in the remote copy network 101. Moreover, a plurality of external storage devices may be connected to a single edge device.

The management network 150 connects the devices existing within the remote copy network 101 (for example, the edge devices 104 and 105, and the core devices 202) with the management server 103. The management server configures edge devices and core devices within the remote copy network 101 via the management network 150, collects information from edge devices and core devices, and provides collected information to hosts via the wide-area network 102. The management network 150 may be one portion of the remote copy network 101, or may be one portion of the wide-area network 103.

Although not appearing in the figure, the external storage 112 and external storage 122 have memory which stores a synchronous remote copy program or an asynchronous remote copy program, and a processor which executes the program.

When the synchronous remote copy program is executed, the external storage defines the pair state (there are five states, which are Simplex (X), Initial-Copying (IC), Duplex (D), Suspend (S), and Duplex-Pending (DP)) in order to indicate the copy state, and manages this information internally.

The Simplex state is a state in which synchronous remote copying between a source volume and a target volume has not been initiated. The Duplex state is a state in which synchronous remote copying has been initiated, the initialization copying described below has also been completed, and the contents of the source volume and target volume are identical. In the case of synchronous remote copying, after data written to the source volume has been copied to the target volume (hereafter, this copying may also be called "update copying"), a writing-completed response is returned to the host which had performed the writing.

Because there may exist areas in each volume in which a unique identifier is stored, or for other reasons, portions specific to a volume need not be identical between the source volume and the target volume.

The Initial-Copying state is an intermediate state in the transition from the Simplex state to the Duplex state. During this period, initialization copying (copying of data already stored in the source volume) from the source volume to the target volume is performed. When initialization copying is completed and the internal processing necessary for the transition to the Duplex state has ended, the pair state becomes Duplex.

The Suspend state is a stated in which update copying is halted. In this state, the macroscopic data identity between the source volume and target volume is no longer guaranteed. Upon an instruction from an operator, a host, or a computer managing external storage, the pair state makes a transition from another state to the Suspend state.

In addition, there is a transition to the Suspend state, when it may not be possible to perform synchronous remote copying from the source volume to the target volume. In such cases the storage automatically makes a transition to the Suspend state. In the following explanation, the latter case is called a "failure Suspend state". Representative causes of such a failure Suspend state are failures in the source volume or target volume, failures in the source external storage or the target external storage, and failure in the communication channel between source external storage and target external storage (in the case of this aspect, network failure between the external storage 112 or 122 and the edge device 104 or 105, or failure of the remote copy network comprising the edge devices 104 and 105). However, failures other than these can also cause a failure Suspend state.

External storage in the Suspend state or the failure Suspend state records the storage area in the volume in which is stored data updated while in the Suspend state or the failure Suspend state, so as to enable execution of differential copying(copying only updated area) between source volume and target volume upon a transition of the pair state to the Duplex-Pending state. The data structure used in recording may be a bitmap(herein named differential bitmap) or log structure, but other structures may be used.

The Duplex-Pending state is an intermediate state in the transition from the Suspend state to the Duplex state. In this state, in order to cause the data of the source volume and target volume to identical, copying of data from source volume to target volume is executed. When identity between the data of the source volume and target volume is secured, the pair state becomes Duplex. Copying of data while in the Duplex-Pending state may utilize information recorded in the data update area while in the Suspend state, described above, to perform differential copying in which only the portion requiring updating is copied. Moreover, the Initial-Copying state and Duplex-Pending state may be combined into a single state and displayed on the screen of a management device, or transitions between these states may be performed.

On the other hand, in the case of asynchronous remote copying, the following method is one method of copying data from the source volume to the target volume.

For example, in one method, each time data writing occurs, the source external storage creates a set (hereafter called a "log entry") of written data and control information comprising the address of the volume to which the data has been written, and transfers this to the target external storage, and the target external storage writes to the target volume the updated data stored in the log entry (hereafter, writing of data stored in a log entry to a volume is called "reflecting the log entry in the volume"). As an extension of this method, information indicating the time and order of writing of the updated data to the source volume is comprised in the control information of a log entry, and when reflecting a log entry in a target volume, this information indicating the time and order is utilized to reflect the log entry in the target volume in the order in which the updated data was written to the source volume.

When asynchronous remote copying is executed as well, the source and target external storage manage the pair state (Simplex, Initial-Copying, Duplex, Suspend, Duplex-Pending, and Suspending (SI)). The Simplex, Initial-Copying, Suspend, and Duplex-Pending states are similar to those for synchronous remote copying.

The Duplex state also is essentially the same as for synchronous remote copying, but because update copying is performed asynchronously with writing from the host, means of data identity differs from that of synchronous remote copying. For the instance, after the host receives a completion response for a write request from the source external storage, the data in the source volume and the data in the target volume are not exactly equal until the updated data is written to the target volume.

The Suspending state is an intermediate state in a transition from the Duplex state to the Suspend state; in the case of asynchronous remote copying, transitions are made to the Suspend state via the Suspending state. In this state, the source external storage and target external storage may perform processing to reflect, in the target external storage, log entries held in the memory of source and target external storages. Also, a method similar to the recording of the write position in the source volume described in the explanation of the Suspend state for synchronous remote copying is used by the source external storage and target external storage to record the write position of updated data in log entries which could not be reflected in the target volume.

Figure 9:
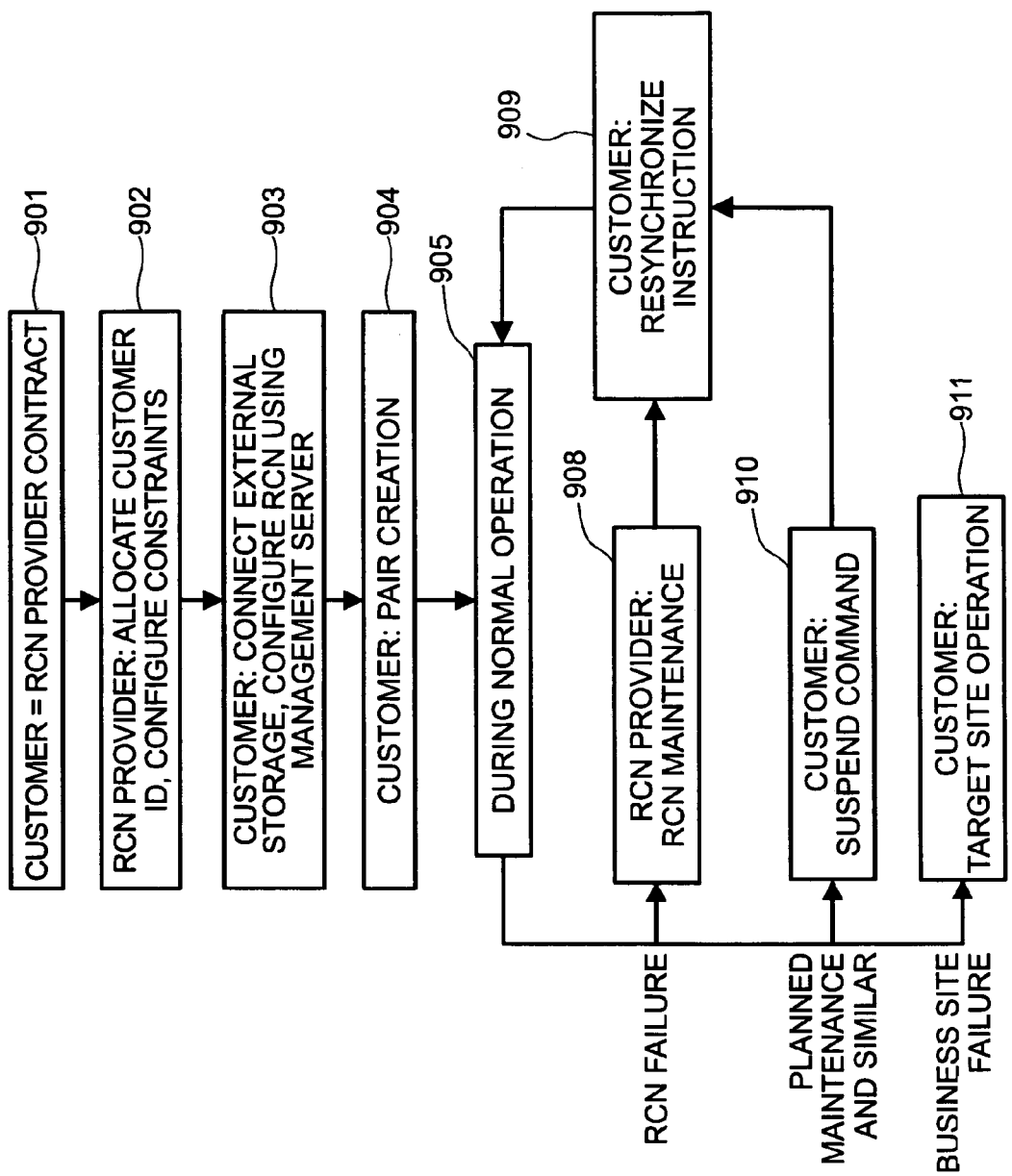
FIG. 9 shows one example of the remote copy processing used by a remote copy network.

FIG. 9 is a flow diagram showing one example of remote copy processing utilizing a remote copy network.

(1) First, the customer and the RCN provider conclude a contract (step 901).

(2) The RCN provider assigns a customer ID to the customer, and configure by inputting to the management server 103 the assigned customer ID and information specific to the customer stipulated by the contract conditions (step 902).

(3) The customer inputs to the management server 103 the WWN (WorldWide Name) of the source external storage 112 and target external storage 122 connected to the RCN, and identification information for the edge device 104 and edge device 105 which are to be connected to these external storage devices, to perform configuration(step 903). Based on this configuration information, the management server 103 instructs the edge device 104 and edge device 105 to create virtual storage 106 and virtual storage 107, and configures routing for the remote copy network 101.

(4) The customer, by inputting a pair creation instruction to the host 111 or to another computer, instructs the source external storage 112 to create a pair (step 904). The instruction to the source external storage 112 passes through the edge device 104, remote copy network 101, and edge device 105 to arrive at the target external storage 122. Upon the occasion of a pair creation instruction, initialization copying from the source volume 113 to the target volume 123 is performed.

(5) The pair of the source volume 113 and target volume 123 enters the Duplex state, and macroscopic identity between source volume 113 and target volume 123 is secured. (step 905).

(6) If a failure occurs within the remote copy network 101, either the external storage 112 or the external storage 122 detects the failure itself, or the remote copy network 101 notifies the external storage 112 or the external storage 122 of the failure occurrence, causing the pair state of these external storage devices to make a transition to the failure Suspend state. Then, after the RCN provider completes maintenance tasks, the customer issues a resynchronization instruction to the source external storage 112 from the management server or from another computer, and resynchronization is performed (steps 908, 909).

(7) In the case of planned maintenance, and when remote copying is to be halted because the target external storage 122 is to be used temporarily by another application program or for some other reason, the customer issues an instruction to the source external storage 112, via the host 111 or the host 121, the management server, or another computer, for transition from the Duplex state to the Suspend state (step 910). Then, when the reason for halting the remote copying is eliminated, the customer issues a resynchronization instruction, via the host 111, the host 121, the management server or another computer, to the source external storage 112, and resynchronization is performed (step 909).

(8) If a failure (site failure) occurs in the source external storage 112, the customer restart the application on the host 121 connected to the target external storage 122 (step 911). Detection of site failure and restart processing may be performed manually by a manager, or may be performed by software, called "cluster software", which handles host monitoring and application restarting.

Figure 3:
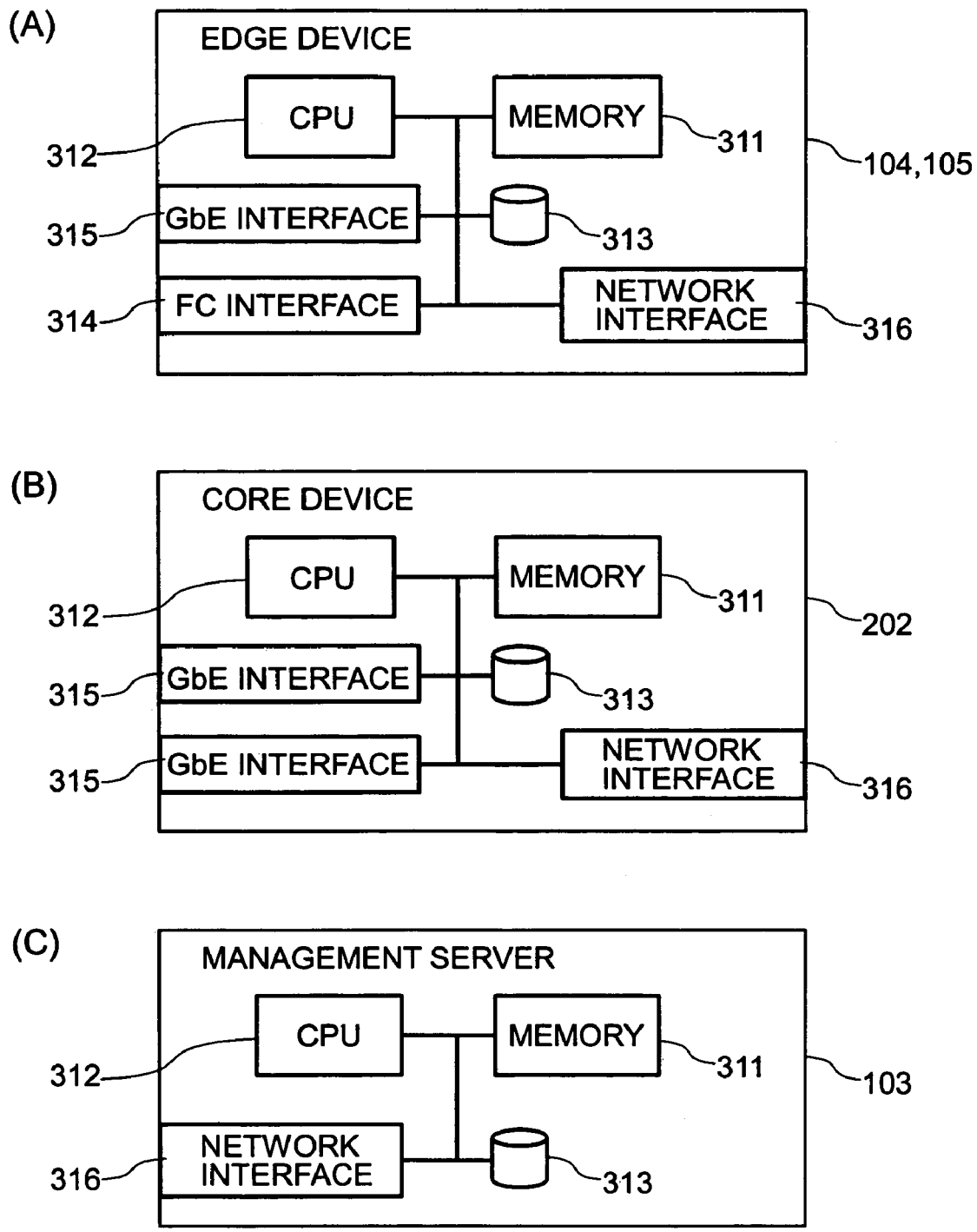
FIG. 3 shows one example of the hardware configuration of an edge device, core device, and management server.

FIG. 3 shows one example of the hardware architecture of an edge device, core device, and management server.

Each of these devices has memory 311, a CPU 312, and a disk device 313, which are interconnected via an internal network or a bus. Programs existing in each device are stored in the memory 311, and programs are executed through the concerted operation of the memory 311, CPU 312, and disk device 313. However, the disk device 313 is not an essential component.

Further, the edge device and core device each have a GbE interface 315, which is hardware for communication over GbE. The edge device has an FC interface 314 for communication by FC with external storage. The edge device, core device, and management server each have a network interface 316 to communicate using the management network 150. The network interface 316 may be the same as the FC interface 314 or GbE interface 315, but any interface enabling communication and supporting other network media and protocols, such as a 100BaseT Ethernet interface, may be used.

FIG. 4 shows one example of a program within the memory 311 or disk device 313 of an edge device or core device, and which runs on the edge device or core device.

The FC protocol stack 401 is a program which is executed by an edge device to perform data transfer via the FC. The IP protocol stack 410 is a program which is executed by an edge device or by a core device 202 to perform data transfer via the GbE according to the IP. An interface driver program to manipulate the GbE interface 315 or FC interface 314, PortID and WWN conversion information present in the FC protocol stack 401, and IP address and MAC (Media Access Control) address conversion information present in the IP protocol stack 410 exist within the memory 311 of the edge device, but are not shown in the figure. In addition, an OS, also not shown, may exist in an edge device and core device.

The RIO protocol stack 402 is a program enabling an edge device to interpret a RIO received from external storage, and is present in an edge device.

The virtual storage provision program 403 is a program to provide virtual storage, behaving as some external storage, to external storage connected the edge device, and is present in the edge device. When providing, to an external storage device connected to the edge device(herein named connected-external storage device for explanation), virtual storage which behaves like opposite side external storage paired for remote copying with the connected-external storage device, the storage device information(that is, the WWN, product number, number of volumes, LUNs to identify volumes, capacity, emulation type, and similar) of the opposite side external storage device paired for remote copying with the connected-external storage device is provided to the connected-external storage as the storage device information of the virtual storage.

However, when there is information which the virtual storage must hold itself (for example, when both the opposite side external storage device and the virtual storage which behaves like opposite side external storage paired for remote copying with the connected-external storage device, exist in same FC network, the virtual storage must use different WWN from the connected-external storage device), the virtual storage provision program 403 provides to the connected-external storage, storage device information specific to the virtual storage rather than storage device information of the opposite side external storage device.

The log entry creation/reflection program 406 is a program to create a log entry 211 based on a RIO transfered to virtual storage 106 acquired from the external storage provision program 403, RIO protocol stack 401, and FC protocol stack 401, and is present in the edge device. In addition, the log entry creation/reflection program 406, after creating a RIO from the log entry 211 acquired from the log entry transfer program 407, also executes processing to transfer this RIO to external storage.

The RIO protocol stack 402, virtual storage provision program 403, and log entry creation/reflection program 406 run on the edge devices 106 and 107.

The log entry transfer program 407 is a program to use the log communication protocol stack 409 and IP protocol stack 410 to transfer log entries 211, and is present in edge devices and core devices.

The log transfer protocol stack 409 is a program to perform communication processing necessary for the transfer of log entries 211 between other edge devices or core devices.

The log entry transfer program 407 and log transfer protocol stack 409 run on the edge devices 106, 107 and core devices 202.

The batch transfer program 420 is a program which controls the log entry transfer program 407 running on a core device in order to efficiently perform transfer of log entries 211. The batch transfer program is present in the core device. The batch transfer program 420 waits a fixed length of time from receipt of a log entry 211 until transfer, and when transferring log entries, transfers a plurality of log entries 211 accumulated in the core device 202 in a batch. However, a batch transfer program 420 may not be used.

Figure 5:
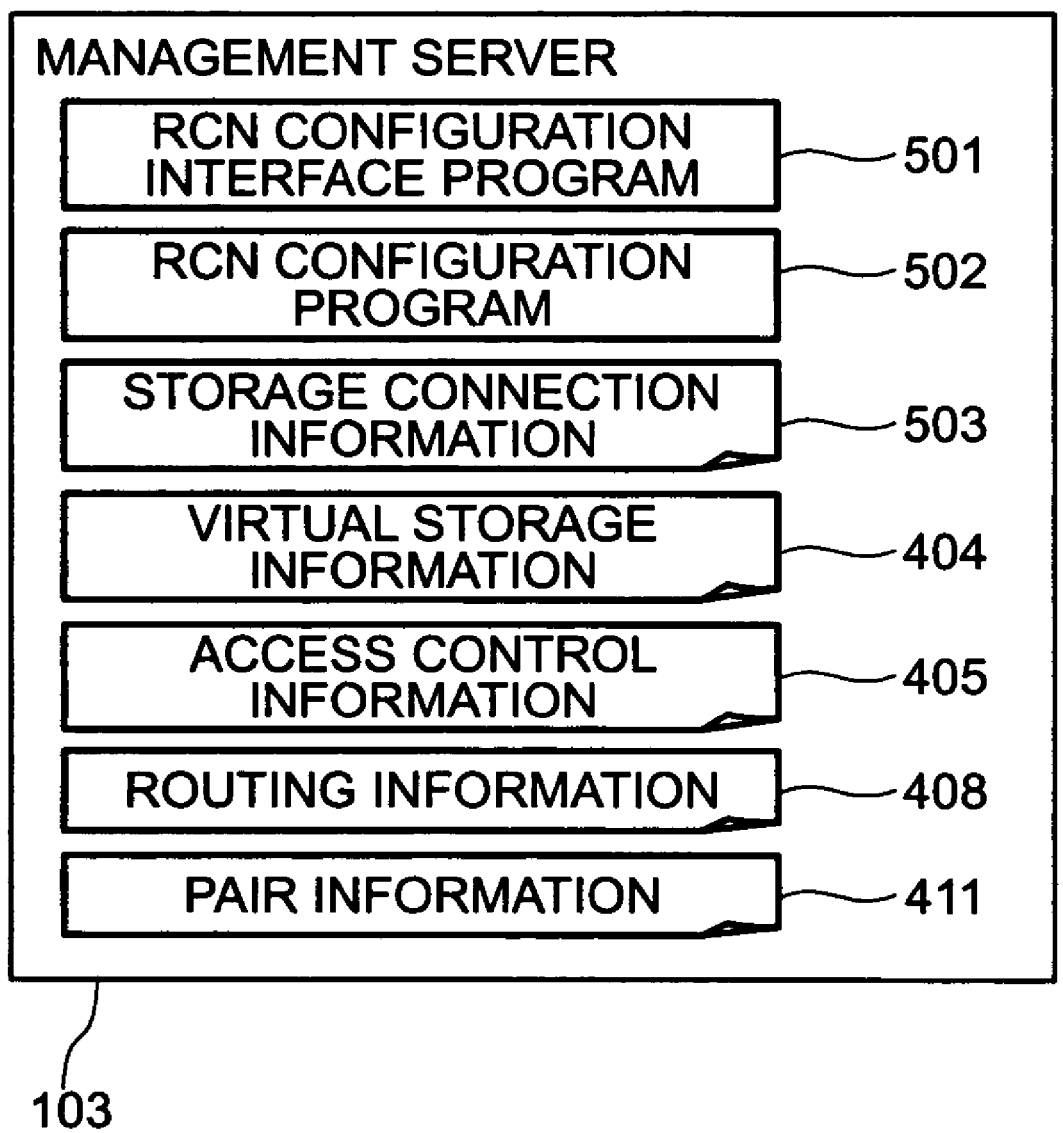
FIG. 5 shows one example of the information and program of a management server.

FIG. 5 shows one example of a program stored in the memory of the management server 103 and running on the management server 103, as well as information stored in the memory of the management server.

The RCN configuration interface program 501 is a program which performs configuration in order to execute remote copy processing between a plurality of external storage devices using the remote copy network 101. The RCN configuration interface program 501 is also a program which outputs to enable user referencing of remote copy network configuration information, storage connection information 503, virtual storage information 404, access control information 405, routing information 408, and pair information 411. Hosts or other computers connected to the wide-area network 102 can use this program, stored in the management server, to reference the state of the remote copy network 101 and perform configuration corresponding to step 903 in FIG. 9 (that is, configuration of the edge devices and core devices comprised in the RCN).

The following two types of information are examples of information configured using the RCN configuration interface program 501; but by inputting configuration information for the RCN configuration interface program running on the management server, the customer or a manager can make other configurations as well.

(A) The WWN of external storage connected to the remote copy network 101, and the ID of the edge device connected to the external storage (B) A list of pairs of source volumes and target volumes for which the data writing order is assured in the remote copy network 101 (or pairs of source external storage and target external storage, or of source edge devices and target edge devices)

Information provided by the RCN configuration interface program 501 may comprise, in addition to the above two configuration values, the following items; but the RCN configuration interface program may output items other than these as well.

(A) WWNs assigned to virtual storage (B) Delay time until data written to source external storage being reflected in the target external storage (C) The presence or absence of log entries remaining within the remote copy network 101

When executing configuration of the RCN according to the contract conditions for each customer in step 903 of FIG. 9, the RCN configuration interface program 501 may also perform processing to limit input values for selection of edge devices, the number of external storage devices connected to the RCN, the number of volume pairs for which the order is assured, and similar, based on the contract conditions. However, this limitation may be execute due to another reason.

The RCN configuration program 502 comprises the following two functions.

(A) A configuration/distribution function which, based on information configured by the RCN configuration interface 501, updates and distributes to edge devices and core devices the storage connection information 503, virtual storage information 404, access control information 405, routing information 408, and pair information 411

(B) An update collection function which collects updates of the pair information 411 and order assurance information 412

The RCN configuration program 502 may also comprise functions to collect and configure information from the remote copy network 101 and from edge devices and core devices 202. In addition to the above-described RCN configuration interface program 501 and RCN configuration program, the memory of the management server also stores storage connection information 503, virtual storage information 404, access control information 405, routing information 408, and pair information 411, described below.

Figure 6:
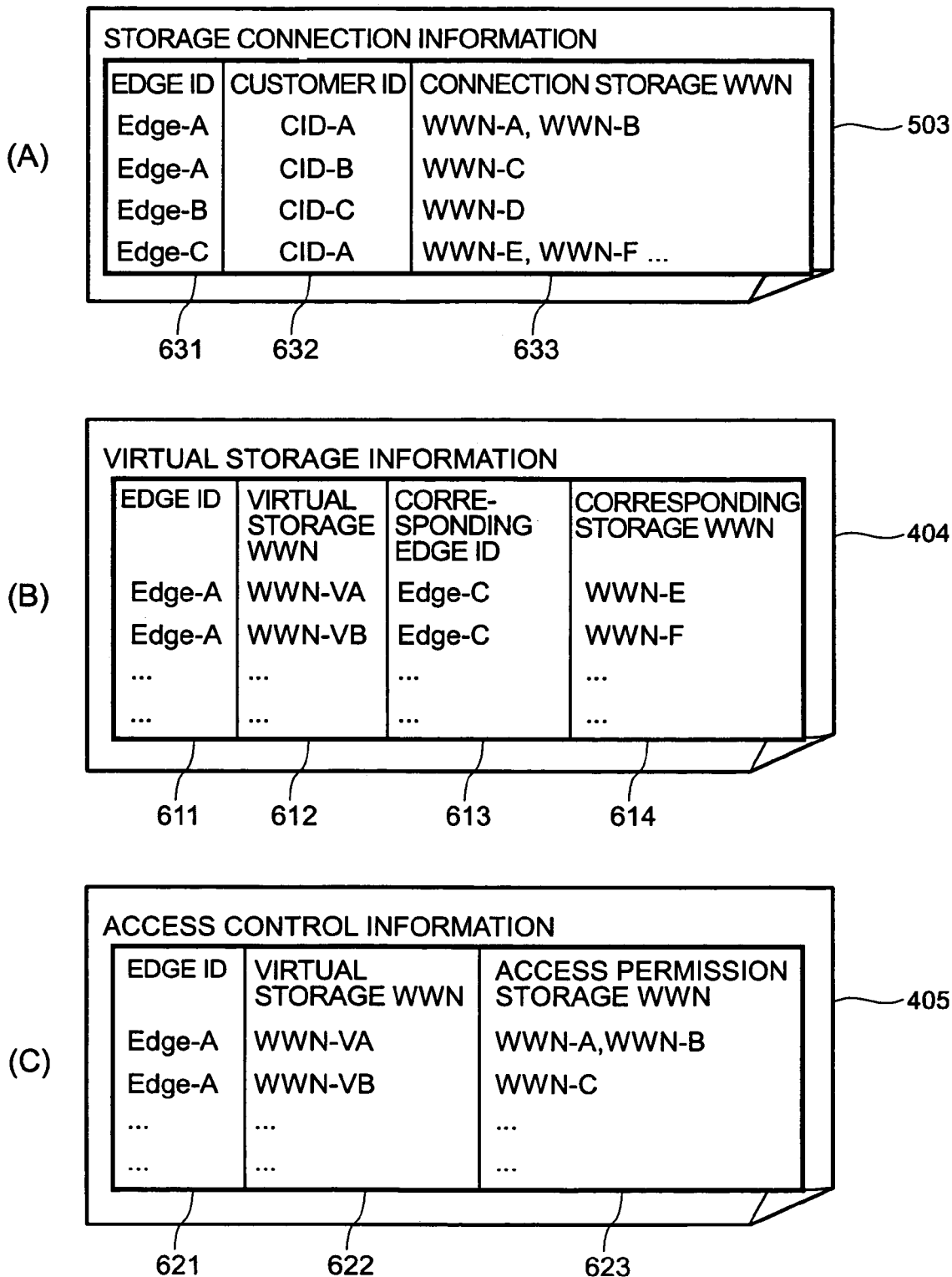
FIG. 6 shows one example of information used by a management server, edge device, and core device.

FIG. 6 and FIG. 7 show examples of information used by the management server 103, edge devices, and core devices.

The storage connection information 503 is information to manage the connection state of external storage with edge devices. This information comprises the IDs 631 of edge devices, customer IDs 632, and the WWNs 633 of external storage connected to edge devices. This information may be configured by the customer in the management server using the RCN configuration interface program 501, but other methods of creation may be used as well.

The virtual storage information 404 is information relating to virtual storage provided by edge devices. A virtual storage WWN 612 is an area for registration of the WWN of virtual storage provided by an edge device to external storage. The corresponding edge ID 613 and corresponding storage WWN 614 indicates the external storage location behaved by the virtual storage having WWN 612. Therefore, ID 613 is area for registration of the ID of the edge device connected to the behaved external storage. And WWN 613 is area for registration of the WWN of the behaved external storage. In this embodiment, as the WWN of the virtual storage 106, the WWN of the external storage 122 is assigned, and as the WWN of the virtual storage 107, the WWN of the external storage 112 is assigned. Taking FIG. 1 as an example, the following values are registered in the virtual storage information 404.

Configuration for Virtual Storage 106

(A) The ID of the edge device 104 as the edge ID 611

(B) The WWN of the target external storage 122 as the virtual storage WWN 612

(C) The ID of the edge device 105 as the corresponding edge ID (D) The WWN of the target external storage 122 as the corresponding storage WWN Configuration for Virtual Storage 107

(A) The ID of the edge device 105 as the edge ID 611

(B) The WWN of the target external storage 112 as the virtual storage WWN 612

(C) The ID of the edge device 104 as the corresponding edge ID (D) The WWN of the target external storage 112 as the corresponding storage WWN The identification numbers (LUNs) of the target volume and virtual target volume provided by virtual storage 106 are assumed to be the same values in this aspect. And LUNs of the source volume and virtual source volume provided by virtual storage 107 are assumed to be the same value in this aspect, too.

The access control information 405 is information to manage control of access to virtual storage provided by edge devices. This information comprises the edge device ID 621, virtual storage WWN 622, and the WWN 623 of the external storage which permits accessing of the virtual storage. Because an edge device may be shared by a plurality of customers, the access control information 405 is generally configured such that the virtual storage of one customer cannot be accessed from the external storage of another customer. However, configuration policies other than this may be adopted. Also, an edge device may perform access control using information other than this.

In cases where accessible ranges are divided among customers, the access control information 405 is created by the management server based on the storage connection information 503 and virtual storage information 404. In the example of FIG. 1, through the configuration indicated below, the virtual storage 106 and virtual storage 107 cannot be used from the other customer's external storage(not shown in FIG. 1) connected to the edge device 104 or the edge device 105.

Configuration of Access Control Information for the Virtual Storage 106

(A) The ID of the edge device 104 as the edge ID 621.

(B) The WWN of the virtual storage 106 as the virtual storage WWN 622

(C) The WWN of the source external storage 112 as the access-permitted storage WWN 623

Configuration of Access Control Information for the Virtual Storage 107

(A) The ID of the edge device 105 as the edge ID 621

(B) The WWN of the virtual storage 107 as the virtual storage WWN 622

(C) The WWN of the source external storage 122 as the access-permitted storage WWN 623

The routing information 408 is information to manage the route for transfer of a log entry 211 created by a source-side edge device 104 to a target-side edge device 105. This information comprises the WWN 711 of the source external storage 112, the WWN 712 of the target external storage 122, and the transit route 714 for sending and receiving log entries 211 between the source external storage and target external storage. Upon input to a management server 103 by the customer of identification information for the source external storage and target external storage, as well as of identification information for the source-side edge device and target-side edge device to which these external storage devices are connected, the RCN configuration program 502 calculates a route and creates routing information 408 such that the number of core devices 202 between the source external storage 104 and target external storage 105 is small, taking into consideration the processing limits of each core device 202 and the effectiveness of batch transfers. The method of deciding on a route may take into account the QoS of data transfer and the possibility of disaster at an edge device or core device 202 in calculations, but other methods may be used as well. Further, the routing information 408 in this embodiment assumes a case in which routes are configured for each pair of source external storage and target external storage; but routing information may be configured in units of order assurance groups, or in units of pairs of source volumes and target volumes.

The pair information 411 is information to manage, mainly in the remote copy network 101, group of remote-copy pair of source volumes and target volumes for which the RIO order is to be assured. This information comprises the actual WWN 721 of the source external storage 112 and the LUN 722 of the source volume 113, the actual WWN 723 of the target external storage 122 and LUN 724 of the target volume 123, the current pair state 725, an ID 726 for order assurance, and a differential bitmap 727 for use when a failure occurs within the remote copy network 101.

The following are three methods for creating pair information 411.

(A) In this method, an edge device receives a pair creation request from external storage (this pair creation request comprises the WWN of the source external storage 112 and LUN of the source volume 113, and the WWN of the target external storage 122 and LUN of the target volume 123), and the edge device creates the pair information. In this case, the following are two methods for registering the order assurance ID 725.

(A-1) In this method, the same ID is assigned to the pair, with the source volume existing in the same source external storage, and the target volume also existing in the same target external storage. In this method, the same ID is assigned to the volume pair for which remote copying is executed between the same external storage devices.

(A-2) In this method, the same ID is assigned to the volume pair for which remote copy processing is executed using the same source edge device and target edge device.

(B) Prior to pair creation, the manager uses the RCN configuration interface program 501 for input together with the update order information.

A method which combines these methods may also be used.

The order assurance information 413 is primarily information to create sequential numbers 804 for log entries 211. This information comprises an order assurance ID 731, log creation counter value 732, log reflection counter value 733, log deletion counter value 734, and reflection delay time 735. The log creation counter value 732 is incremented by the edge device 104 each time a log entry 211 is created, and the log deletion counter value 734 is incremented by the edge device 104 each time a log entry 211 is deleted. The log reflection counter value 733 is incremented by the edge device 105 each time a log entry 211 is reflected in external storage 122.

The value resulting from subtraction of the I/O time 804 of a log entry 211 from the current time is registered in the reflection delay time 735 each time edge device 105 reflects a log entry to external storage 122. This information is periodically sent from edge device 105 to the RCN configuration interface program 501 of the management server 103, and is provided to the customer by being output from management server 103.

Figure 15:
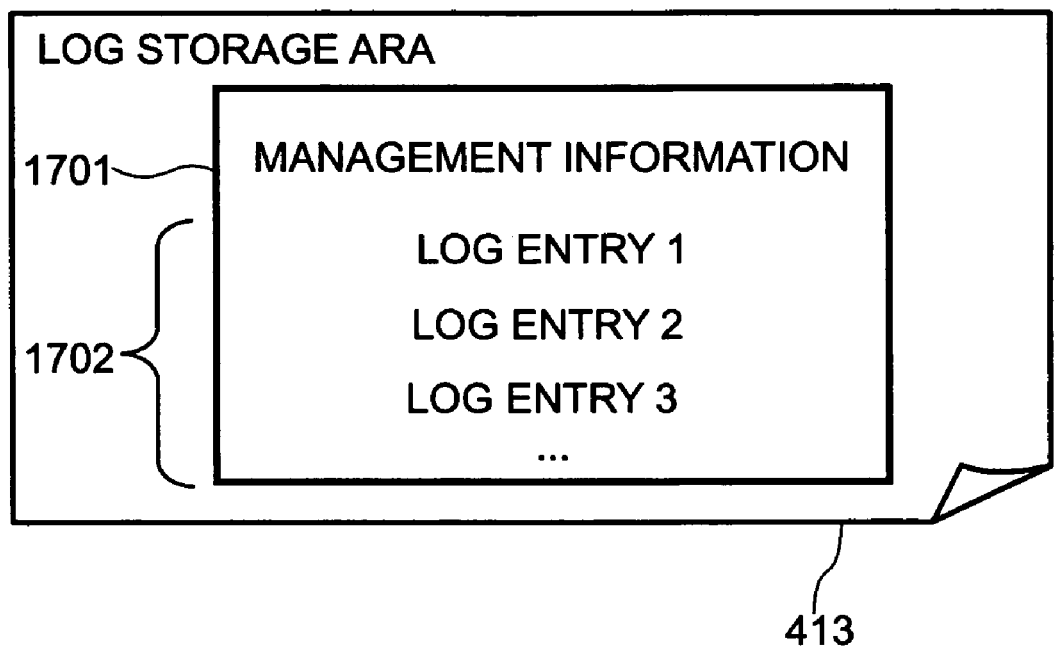
FIG. 15 shows one example of a log storage area.

Though not shown in FIG. 6 and FIG. 7, log entries 211 are also stored in edge devices. Log entries 211 are stored in the log storage area 413 shown in FIG. 15, and the log storage area 413 comprises an area 1702 storing one or more log entries 211 and management information 1701 to manage the storing place. The log entry creation/reflection program 406 acquires information in the log storage area 413 in response to a request from the RCN configuration interface program 501, and provides this to the RCN configuration interface program.

Copies of the virtual storage information 404, access control information 405, and pair information 411 exist in the edge device. Also, a copy of the routing information 408 exists in edge devices and core devices 202. Copies may be partial copies.

Figure 8:
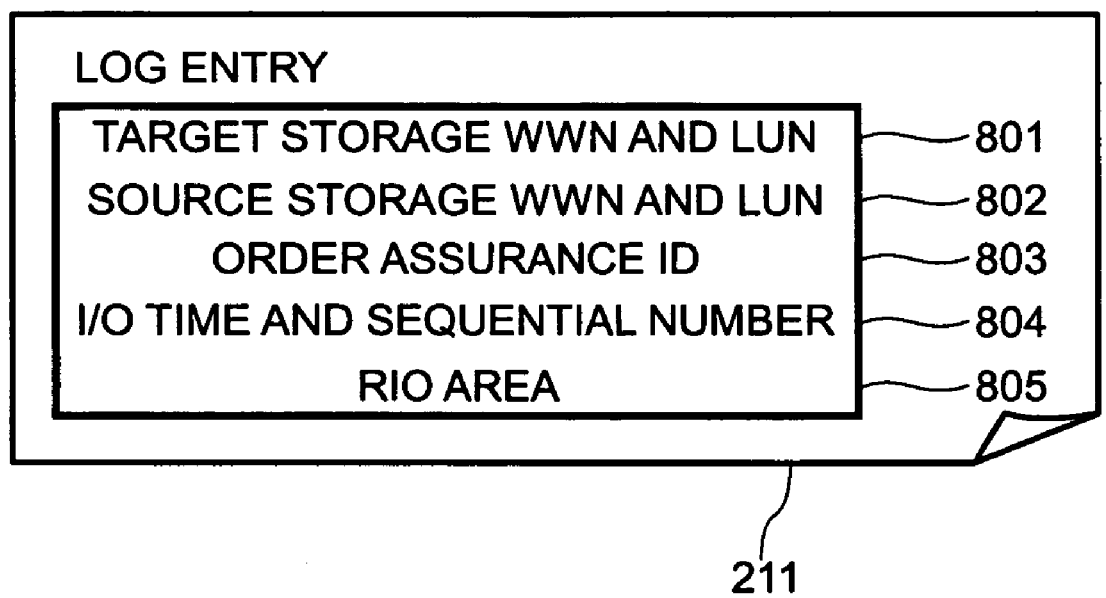
FIG. 8 shows one example of a log entry.

FIG. 8 is a schematic diagram showing an example of the data structure of a log entry 211.

The "WWN of target storage and volume LUN information" 801 is information indicating the WWN and LUN of external storage which is the transfer destination of a RIO converted into a log entry 211. The "source storage WWN and volume LUN information" 802 is information indicating the WWN and LUN of external storage which is the transfer source of a RIO converted into a log entry 211.

The order assurance ID 803 and "I/O time and sequential number information" 804 are information to convey the reflection order between log entries 211. That is, the I/O time is the time at which write data comprised in a log entry from a host to the source external storage was written, and the sequential number is a number indicating the order of writing of write data from the host to the source external storage.

The RIO area 805 is an area for storing a RIO which is to be converted into a log entry.

A log entry 211 may comprise information other than the above as well.

Figure 14:
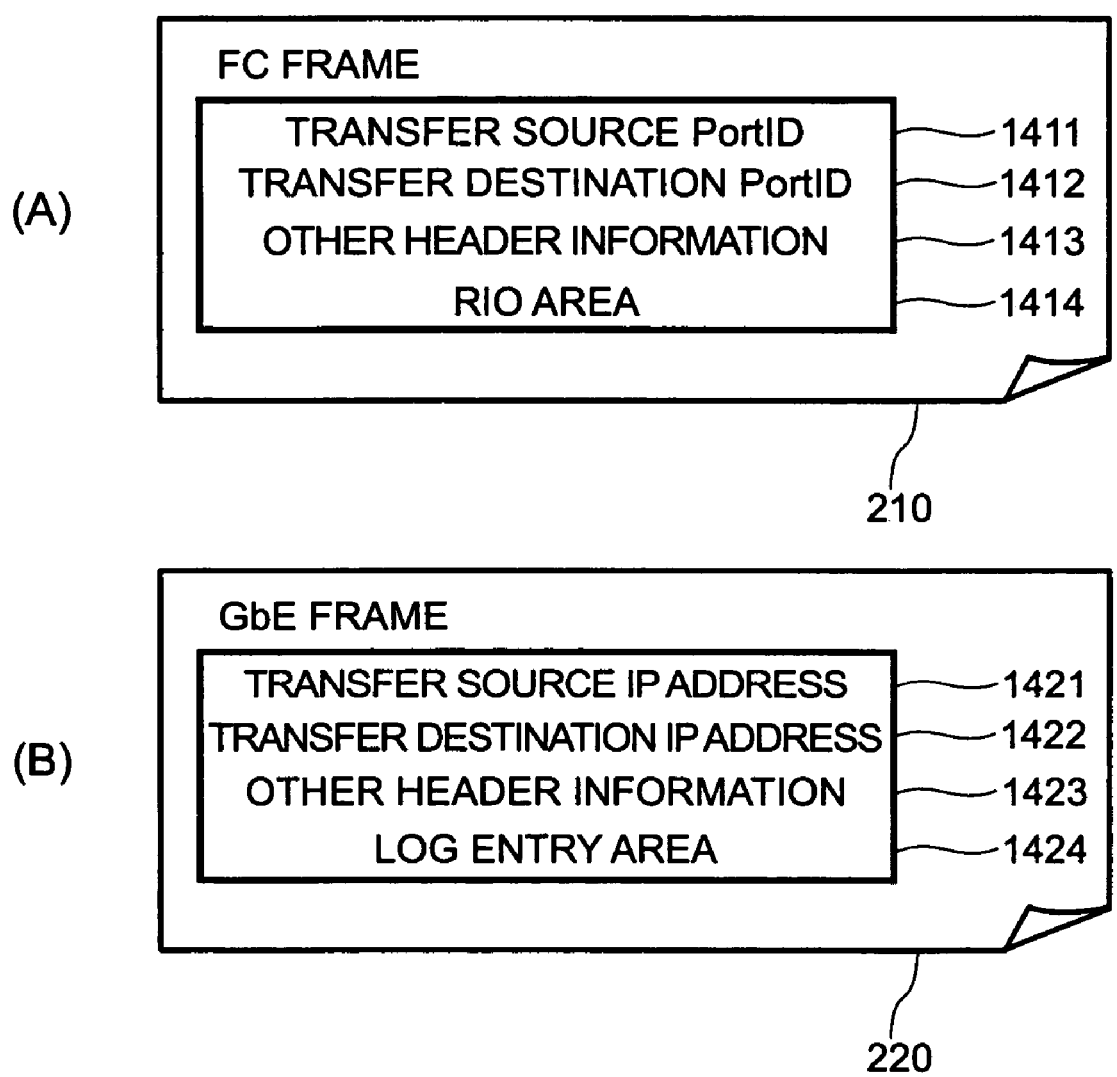
FIG. 14 shows examples of an FC frame and a GbE frame.

FIG. 14 shows examples of an FC frame 220 and GbE frame 210.

The FC frame 220 comprises a transfer source PortID 1411, transfer destination PortID 1412, RIO area 1414, and other header information 1413. The RIO area comprises RIOs for transfer.

The GbE frame comprises a transfer source IP address 1421, transfer destination IP address 1422, log entry area 1424, and other header information 1423. The log entry area comprises log entries for transfer.

A RIO or log entry may be divided into a plurality of frames and sent, for example, in order to transfer a RIO or log entry of size exceeding the maximum frame size.

Figure 10:
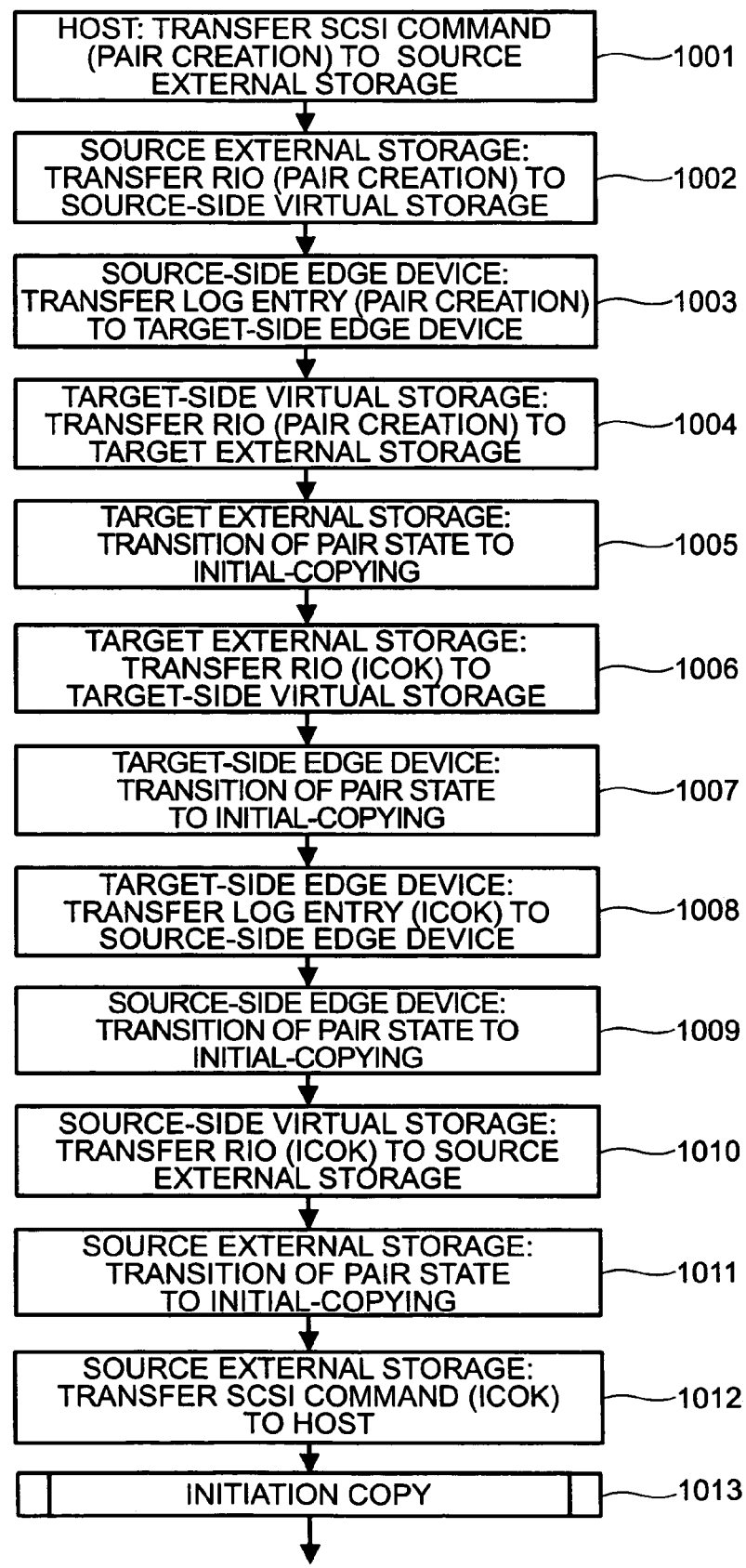
FIG. 10 shows one example of pair creation processing and initial copy processing in an information processing system.
Figure 11:
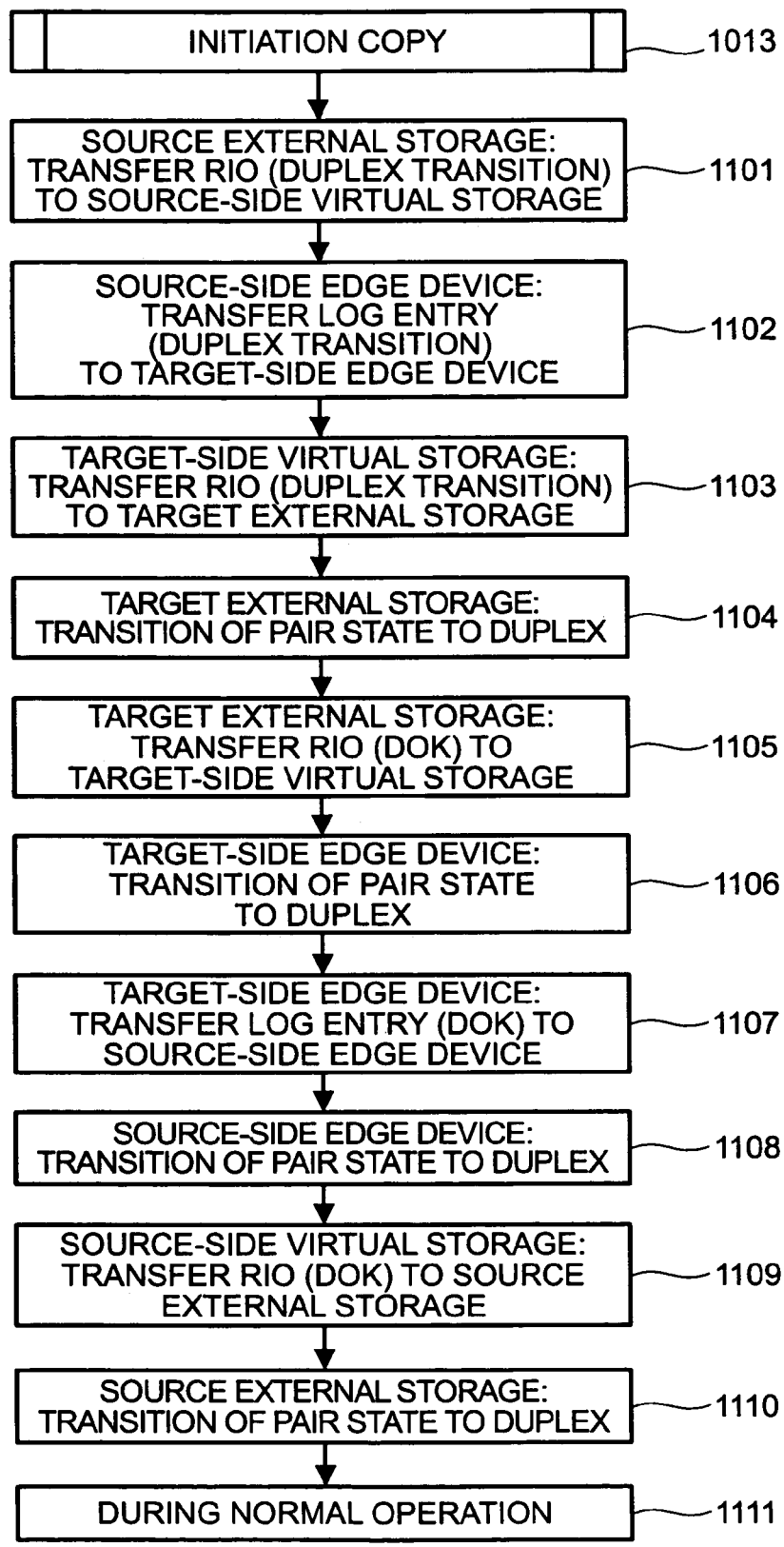
FIG. 11 shows one example of initial copy processing and processing for transition to the Duplex state in an information processing system.

FIG. 10 and FIG. 11 are flowcharts showing examples of system operation from the issuing of an instruction for pair creation in step 904 of FIG. 9, until initialization copying is performed and the pair state makes the transition to Duplex.

In step 903 of FIG. 9, it is assumed that configuration by the RCN configuration interface program 501 and updating of the storage connection information 503, virtual storage information 404, access control information 405, routing information 408, and pair information 411 by the RCN configuration program 502 have been completed. It is also assumed that edge devices and core devices 202 have provided virtual storage, initiated access control, and initialized order assurance information 413 based on the above information.

Transition From the Simplex State to the Initial-Copying State (1) The host 111 sends a SCSI command instructing pair creation such that the volume 113 and volume 123 become a pair to the source external storage 112 (step 1001).

(2) The source external storage 112 sends, to the edge device 104 providing source-side virtual storage 106, an FC frame having a RIO (pair creation) according to the SCSI command (instructing pair creation) received from the host (step 1002). In this aspect, the volume 123 and virtual volume 108 are identified by the same identification information (WWN and LUN). Hence when the source external storage 112 sends the above RIO (for pair creation) to the source-side edge device 104, the effect is similar to that of instructing the source-side edge device 104 to create a pair of the volume 113 and virtual volume 108.

(3) The source-side edge device 104 creates a log entry (pair creation) comprising the RIO (for pair creation) received from the source external storage, stores this in a GbE frame and sends this to the target-side edge device 105 (step 1003).

(4) The edge device 105 providing target-side virtual storage 107, upon receiving the log entry (pair creation), sends an FC frame having the RIO (pair creation) comprised in the log entry to the target external storage 122. In this aspect, the volume 113 and virtual volume 109 are identified by the same identification information (WWN and LUN). Hence for the target-side edge device 105, the received log entry (pair creation) has the same meaning as a RIO instructing handling of the virtual volume 109 and volume 123 as a pair (step 1004).

(5) The target external storage 122, upon receiving the RIO (pair creation), changes the pair state of the volume 113 and volume 123 to Initial-Copying (step 1005).

(6) The target external storage 122 sends, to the edge device 105 providing the target-side virtual storage 107, an FC frame comprising a RIO (Initial-Copying transition completed (hereafter called "ICOK")) indicating completion of the transition to the Initial-Copying state (step 1006).

(7) Upon receiving the RIO (ICOK), the target-side edge device 105 changes the pair state of the virtual volume 109 and volume 123 to Initial-Copying (step 1007).

(8) The target-side edge device 105 creates a log entry (ICOK) having the RIO (ICOK), and sends a GbE frame having this log entry (ICOK) to the source-side edge device 104 (step 1008).

(9) The source-side edge device 104 changes the pair state of the volume 113 and virtual volume 108 to Initial-Copying (step 1007).

(10) The edge device 104 providing the source-side virtual storage 106 sends the RIO (ICOK) comprised in the received log entry in an FC frame to the source external storage 112 (step 1010).

(11) The source external storage 112 changes the pair state of the volume 113 and volume 123 to Initial-Copying (step 1011).

(12) The source external storage 112 transfers a SCSI command (ICOK) to the host 111 (step 1012).

Initialization Copying

(13) Initialization copying from the source external storage 112 to the target external storage 122 is performed (step 1013). The method of initialization copying is the same as writing performed during normal operation, described below.

Transition of Pair State to Duplex

(14) The source external storage 112 sends, to the edge device 104 providing the source-side virtual storage 106, a RIO (Duplex transition) instructing a transition of the pair state of the source volume 113 and target volume 123 to the Duplex state, in the form of an FC frame (step 1101). As described above, the target volume 123 and the virtual volume 108 provided by the source-side edge device 104 are identified by the same identification information, so that the RIO (Duplex transition) sent by the source external storage 112 is, for the source-side edge device 104, in effect a RIO instructing a transition of the pair state of the source volume 113 and virtual volume 108 to the Duplex state.

(15) The source-side edge device 104 creates a log entry (Duplex transition) having the received RIO (Duplex transition), and sends the log entry (Duplex transition) in the form of a GbE frame to the target-side edge device 105 (step 1102).

(16) The edge device 105 providing the target-side virtual storage 107, upon receiving the log entry (Duplex transition), transfers the RIO (Duplex transition) comprised in the log entry (Duplex transition) to the target external storage 122 (step 1103). As described above, because the source volume 113 and the virtual volume 109 provided by the target-side edge device 105 are identified by the same identification information, for the target edge device 105, the received log entry (Duplex transition) is a log entry instructing a transition of the pair state of the virtual volume 109 and target volume 123 to the Duplex state.

(17) On receiving the RIO (Duplex transition), the target external storage 122 changes the pair state of the volume 113 and volume 123 to Duplex (step 1104).

(18) The target external storage 122 sends, to the edge device 105 providing the target-side virtual storage 107, a RIO reporting completion of the transition to the Duplex state (Duplex transition complete (hereafter called "DOK")) (step 1105).

(19) The target-side edge device 105, on receiving the RIO (DOK), changes the pair state of the virtual volume 109 and volume 123 to Duplex (step 1106).

(20) Also, the target-side edge device 105 sends a log entry (DOK) having the received RIO (DOK) to the source-side edge device 104 (step 1107).

(21) On receiving the log entry (DOK), the source-side edge device 104 changes the pair state of the volume 113 and virtual volume 108 to Duplex (step 1108).

(22) Also, the edge device 104 having the source-side virtual storage 106 sends the RIO (DOK), comprised in the received log entry (DOK), to the source external storage 104 (step 1109).

(23) The source external storage 103 changes the pair state of the volume 113 and volume 132 to Duplex (step 1110).

Figure 16:
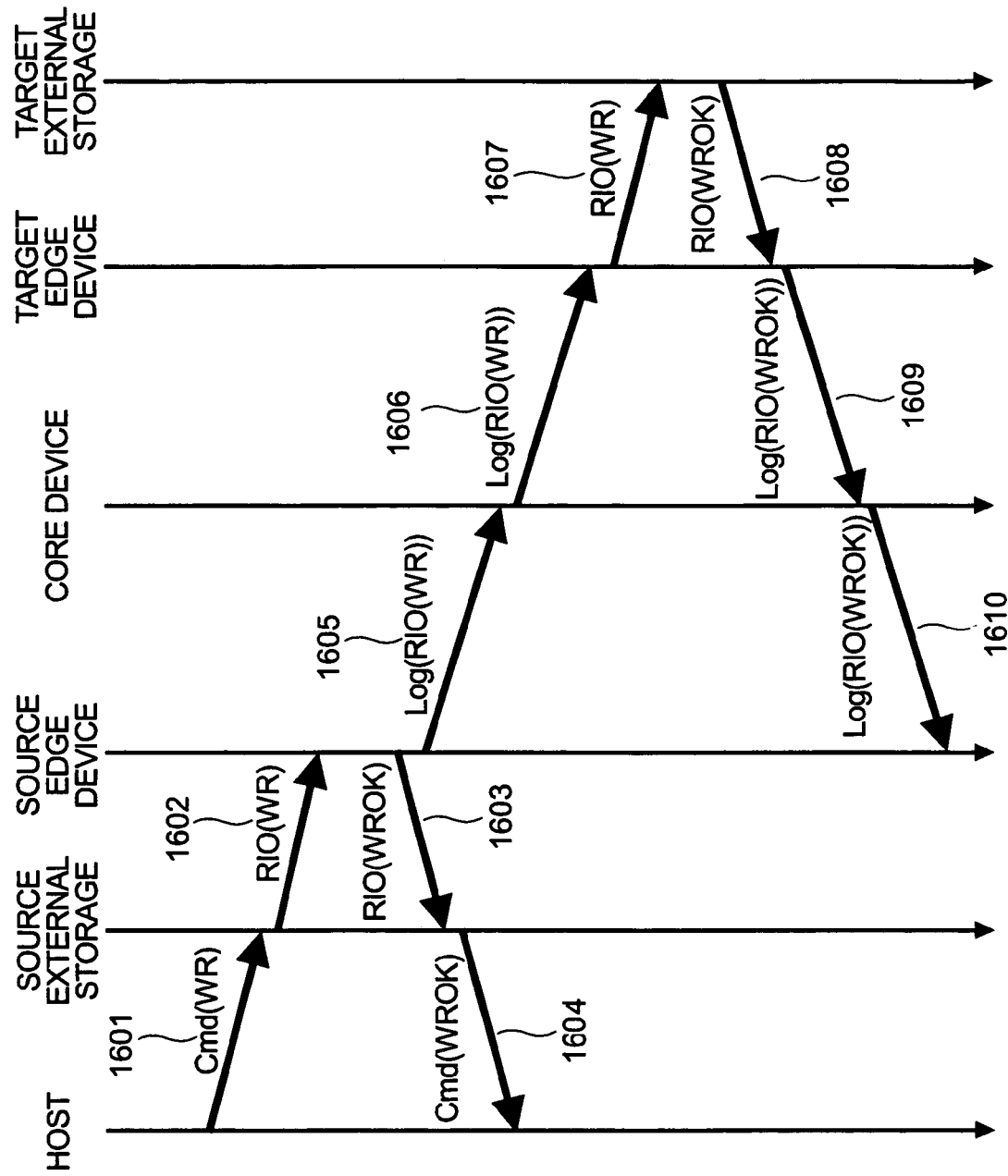
FIG. 16 shows one example of processing when data is written from a host to a source external storage system.

FIG. 16 is a timeline showing one example of command transfer processing (that is, write processing during normal operation) when there is data writing to the source external storage system from a host in an information processing system. In this timeline, FC and IP (UDP, TCP) level Acknowledge messages are omitted.

(1) The source-side host sends to the source external storage 112 an SCSI command (write (hereafter "WR")) instructing data writing (arrow 1601). This SCSI command (WR) comprises information to specify the volume 113 which is the data write destination (the WWN (more precisely, the PortID and LUN are comprised)).

(2) The source external storage 112 references the pair information contained within the source external storage based on the WWN and LUN comprised in the SCSI command (WR), and acquires the target storage WWN and target LUN. The source external storage 112 then sends a FC frame, having the transfer source PortID 1411 calculated from the WWN of the source external storage 112 and the transfer destination PortID 1412 calculated from the aquired WWN. This FC frame comprises a RIO (WR) specifying data writing; the RIO (WR) comprises identification information (WWN and LUN) for the source volume 113 and target volume 123 (arrow 1602). In this aspect, as described above, the WWN of the target external storage 112 is equal to the WWN of the virtual storage 106, and the LUN of the target volume 123 is equal to the LUN of the virtual volume 108, so that the RIO (WR) sent by the source external storage 112 is received by the source-side edge device 104 providing the virtual storage 106.

(3) The source-side edge device 104 creates a log entry 211 (WR) from the RIO (WR), and sends to the source external storage 112 a RIO reporting completion of writing (write completion (hereafter "WROK")) (arrow 1603).

(4) On receiving the RIO (WROK), the source external storage 112 sends a SCSI command (WROK) to the source-side host 111 (arrow 1604).

(5) The source-side edge device 104 sends the created log entry (WR), according to the routing information 408, to a core device 202 (arrow 1605). At this time, the source-side edge device 104 makes a copy of the sent log entry (WR).

(6) The core device 202 sends the log entry 211 (WR) to the target-side edge device 105 according to the routing information 408 (arrow 1606).

(7) The target-side edge device 105 converts the log entry 211 (WR) into a RIO (WR), and sends the converted RIO to the target external storage 122 (arrow 1607).

(8) The target external storage 122 reflects the received RIO (WR) in the volume 123, and sends a RIO (WROK) to the edge device 105 providing the target-side virtual storage 107 (arrow 1608).

(9) The target-side edge device 105 creates a log entry 211 (WROK) having the received RIO (WROK), and sends this log entry 211 to the core device 202 according to the routing information 408 (arrow 1609). Then, the target-side edge device 105 deletes the log entry 211 (WROK).

(10) The core device 202 transfers the received log entry 211 (WROK) to the source-side edge device 104 according to the routing information 408 (arrow 1610).

(11) Upon receiving the log entry (WROK), the source-side edge device 104 deletes the log entry (WR) corresponding to this log entry (WROK).

The above example is a case of routing which passes once through the core device 202; when there is no core device 202, the transfer processing by the core device 202 may be omitted, and when there is a plurality of core devices 202, transfer processing between core devices 202 may be added.

When the target-side edge device 105 or core device 202 loses a log entry (WR) due to failure or for some other reason, the log entry (WR) held by the source-side edge device 104 is resent. For example, when the source-side edge device 104 does not receive the log entry (WROK) within a stipulated time, resending is executed. When remote copying cannot be continued even after such resending (corresponding to step 908 in FIG. 9), the edge device 104 and edge device 105 instruct the external storage 112 and external storage 122 to make a transition to the failure Suspend state. At this time, the source-side edge device 104 converts the log entry (RW) held in the log storage area into a differential bitmap 27 of the pair information 411 and holds this bitmap.

Figure 12:
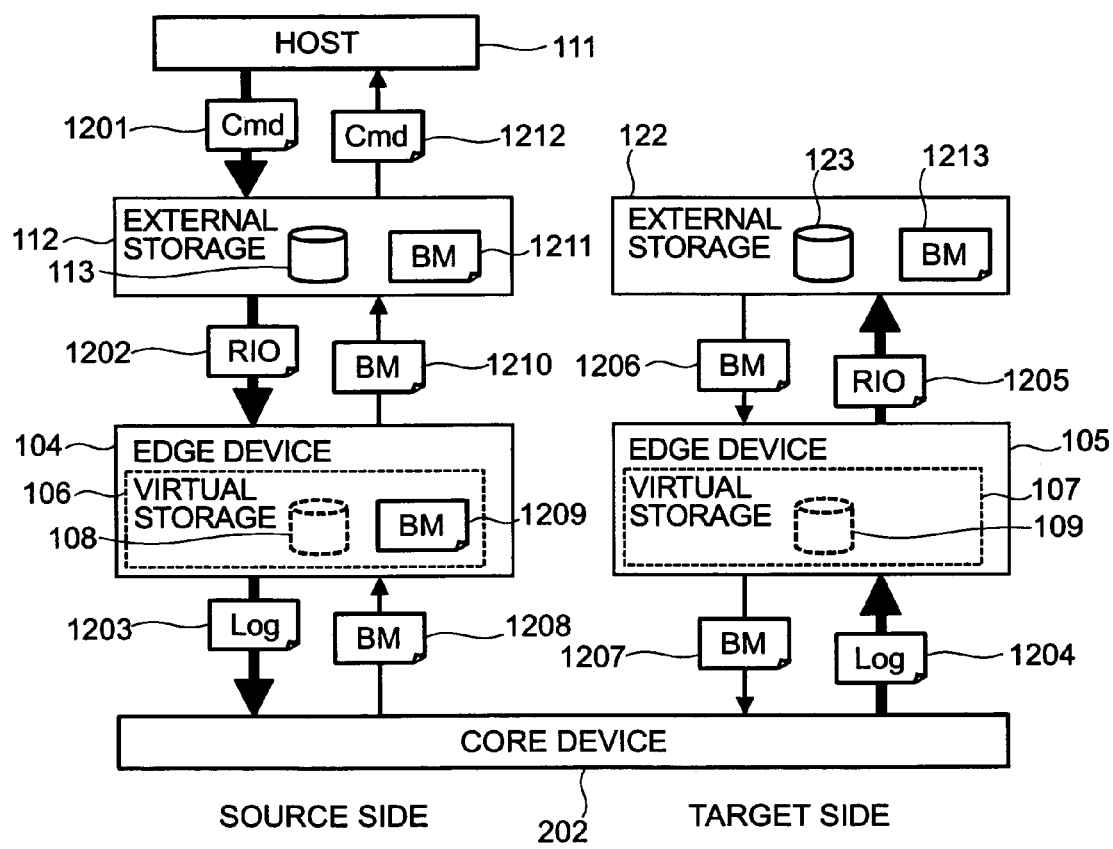
FIG. 12 shows one example of resynchronization processing from a Suspend state or from a failure Suspend state.

FIG. 12 shows one example of resynchronization processing from the Suspend state or from the failure Suspend state.

(0) The external storage 112, after entering the Suspend state or failure Suspend state, records the update position for writing to the volume 113 in the differential bitmap 1211. Similarly, when there is writing to the volume 123 after entering the Suspend state or failure Suspend state, the external storage 122 records the update position in the differential bitmap 1213.

(1) The host 111 sends a SCSI command (resynchronize) instructing resynchronization to the source external storage 112 (data 1201). This SCSI command comprises the volume pair for resynchronization, that is, identification information (LUN and WWN) for the source volume 113 and target volume.

(2) Based on the received SCSI command (resynchronize), the source external storage 112 sends a RIO (resynchronize) to the source-side edge device 104 which provides the source-side virtual storage 106 (data 1202). This RIO (resynchronize) also comprises the LUN and WWN of the volume pair to be resynchronized. In this aspect, the volume 123 and virtual volume 108 are identified by the same identification information (WWN and LUN). Hence as a result of sending the above-described RIO (resynchronize) to the source-side edge device 104 by the source external storage 112, an effect similar to instructing the source-side edge device to resynchronize the pair of the volume 113 and virtual volume 108 is obtained.

(3) The source-side edge device 104 converts the RIO (resynchronize) into a log entry 211 (resynchronize) having this RIO (resynchronize), and transfers the log entry to the core device 202 (data 1203).

(4) The core device 202 transfers the log entry 211 (resynchronize) to the target-side edge device 105 (data 1204).

(5) The target-side edge device 105 providing the target-side virtual storage 107 converts the received log entry (resynchronize) into a RIO (resynchronize), and sends this RIO (resynchronize) to the target-side external storage 122 (data 1205). In this aspect, the volume 113 and virtual volume 109 are identified by the same identification information (WWN and LUN). Hence for the target-side edge device, the log entry (resynchronize) means an instruction to resynchronize the virtual volume 109 and the target volume 123.

(6) Upon receiving the RIO (resynchronize), the target external storage 122 changes the pair state of the volume 113 which the target external storage itself has and the volume 123 to Duplex-Pending. And, the target external storage 122 sends a RIO (Duplex-Pending transition completed (hereafter "DPOK")) comprising a differential bitmap 1213 held by the target external storage 122 to the edge device 105 providing the target-side virtual storage 107 (data 1206).

(7) The target-side edge device 107 changes the pair state of the virtual volume 109 which the edge device 107 itself has and the target volume 123 to Duplex-Pending. Also, the target-side edge device 107 sends to the core device a log entry 211 (DPOK) comprising the received RIO (DPOK) (data 1207).

(8) The core device 202 transfers the received log entry (DPOK) to the source-side edge device 104 (data 1208).

(9) The source-side edge device 104 combines the differential bitmap 1213 comprised in the received log entry (DPOK) and the differential bitmap 727 to create the differential bitmap 1209 (data 1209).

(10) The source-side edge device 104 having the source-side virtual storage 106 changes the pair state of the virtual volume 108 which the edge device 104 itself has and the volume 113 to Duplex-Pending. Further, the source-side edge device 104 which provides the source-side virtual storage 106 sends a RIO (DPOK) comprising the differential bitmap 1209 to the source external storage 112 (data 1210).

(11) The source external storage 112 combines the differential bitmap 1209 and the differential bitmap 1211 held by the external storage 112 itself, to obtain a new differential bitmap 1211 (data 1211).

(12) The source external storage 112 changes the pair state of the volume 113 which the external storage itself has and the volume 123 to Duplex-Pending. Further, the source external storage 112 transfers a SCSI command (DPOK) to the host 111 (data 1212).

(13) Then, the source external storage 112 initiates differential copying according to the differential bitmap 1211.

Figure 13:
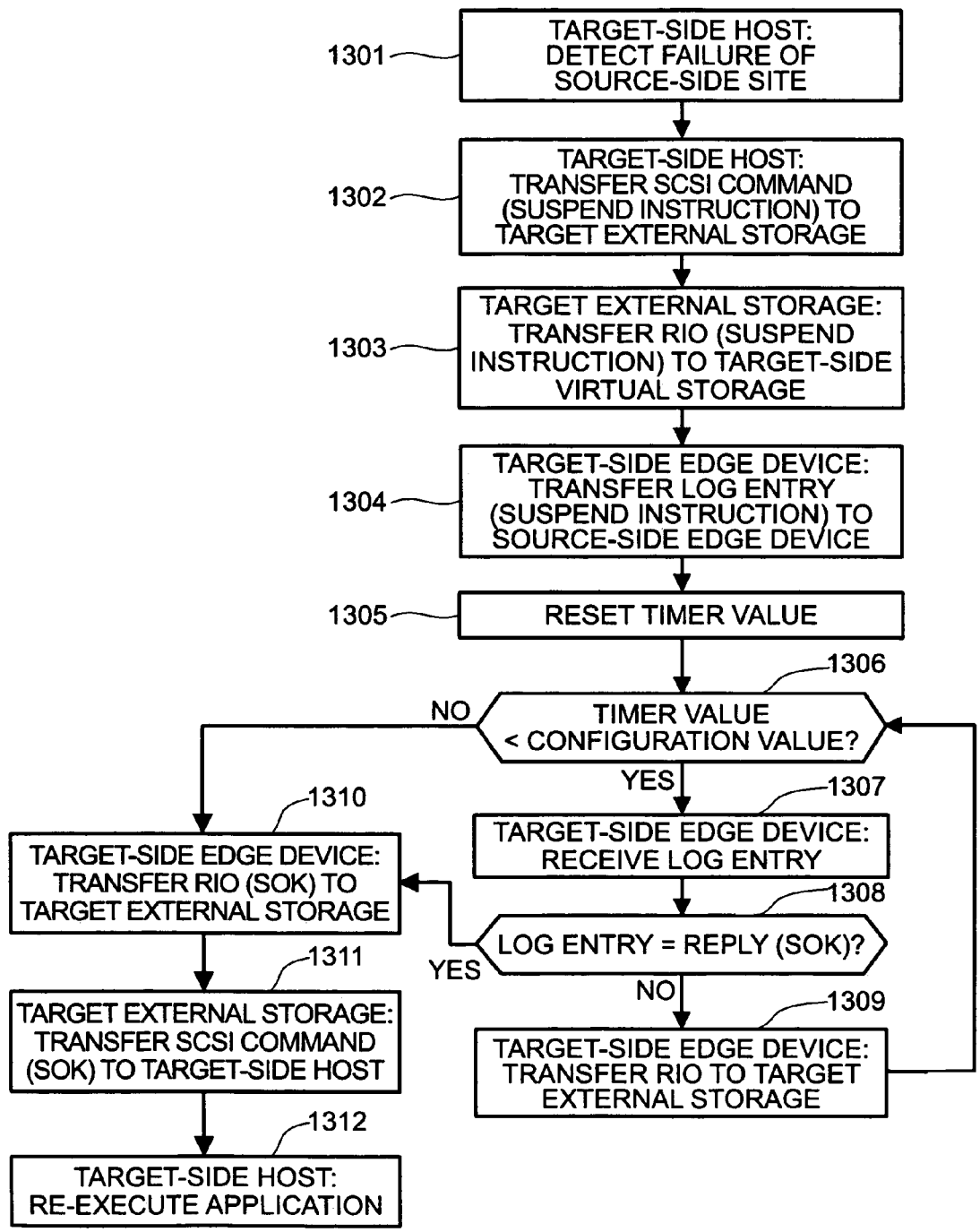
FIG. 13 shows one example of processing upon failover.

FIG. 13 is a flow diagram showing an example of operation of the target-side host 121, target external storage 122, and target-side edge device 105 when disaster occurs at the source-side site during normal operation and failover occurs at the target-side host. The processing shown in FIG. 13 corresponds to step 911 in FIG. 9.

(1) The target-side host 121 detects a source-side site failure (step 1301). The occasion for detection may be notification from cluster software, a target-side edge device 105 or a management server 103, but other occasions are possible.

(2) The target-side host 121 sends a SCSI command (Suspend instruction) to the target external storage 122 (step 1302). This SCSI command comprises the volume pair which is make the transition to the Suspend state or to the failure Suspend state, in other words, the identification information(WWN and LUN) for the source volume 113 and the target volume 123.

(3) The target external storage 122 sends a RIO (Suspend instruction) to the target-side edge device 105 providing the target-side virtual storage 107 (step 1303). This RIO (Suspend instruction) also comprises the above-described identification information for the volume 113 and volume 123.

(4) The target-side edge device 105 creates a log entry (Suspend instruction) having the received RIO (Suspend instruction), and sends the log entry 211 (Suspend instruction) to the source-side edge device 104 (step 1304). The source-side edge device 104, upon receiving this log entry, executes the following processing.

(A) First, the source-side edge device 104 transfers all the log entries 211 relating to the pair of the volume 113 and the volume 123 (for the source-side edge device, the virtual volume 108) to the core device 202 or to the edge device.

(B) Next, the source-side edge device 104 changes the pair state relating to the volume 113 and virtual volume 108 to the failure Suspend state. As described above, in this aspect the virtual volume 108 and the target volume 123 are identified by the same identification information (WWN and LUN), so that the source-side edge device 104, upon receiving the above log entry (Suspend instruction), interprets this log entry (Suspend instruction) as instructing a change in the pair state for the source volume 113 and virtual volume 108 to the failure Suspend state.

(C) Then, the source-side edge device 104 creates a log entry reporting the transition of the pair state to the failure Suspend state (Suspend transition completed (hereafter "SOK")), and sends this log entry to the target-side edge device 105.

(5) The target-side edge device 105 resets the timer value (step 1305).

(6) When the current timer value exceeds the timeout setting, the target-side edge device 105 proceeds to step 1310, and otherwise proceeds to step 1307 (step 1306).

(7) The target-side edge device 105 receives the log entries 211 transferred from other edge devices and from core devices 202, and checks whether the received log entries 211 are log entries (SOK) from the source-side edge device 104 (steps 1307, 1308). If they are such log entries, processing proceeds to step 1310, and otherwise proceeds to step 1309. In step 1308, "there are no missing log entries (SOK)" may be added as a condition for the transition to step 1310.

(8) The target-side edge device 105 references the I/O time and sequential number within the received log entries converts the received log entries 211 into RIOs and sends the RIOs to the target external storage with preserving write order relations (step 1309). Then, processing returns to step 1306. The transferred RIOs are reflected in the volume 123 of the target external storage 122.

(9) The target-side edge device 105 changes the pair state of the target volume 123 and virtual volume 109 to failure Suspend, and then sends a RIO (SOK) to the target external storage 122 (step 1310). Upon receiving a RIO (SOK), the target external storage 122 changes the pair state of the target volume 123 and source volume 113 to the failure Suspend state, and then transfers to the target-side host 121 a SCSI command (SOK) corresponding to step 1302 (step 1311).

(10) The target-side host 121 restarts processing by the application program using the volume 123 within the target external storage 122 (step 1312).

As a modification of this procedure the steps 1310, 1311, 1312 may be executed to promptly execute the transition to the failure Suspend state after step 1303. In this case, even after the target external storage 105 sends the RIO (SOK), log entries 211 remains in the remote copy network 101. The RCN configuration interface program 501 is used to acquire remaining log entries from the RCN, to resolve this problem. If, after completion of the transition to failure Suspend, the target external storage 122 does not receive a RIO (WR) to reflect in the target volume 123 the write data held as log entries by the RCN, this write data may be reflected using a SCSI command (WR).

Figure 19:
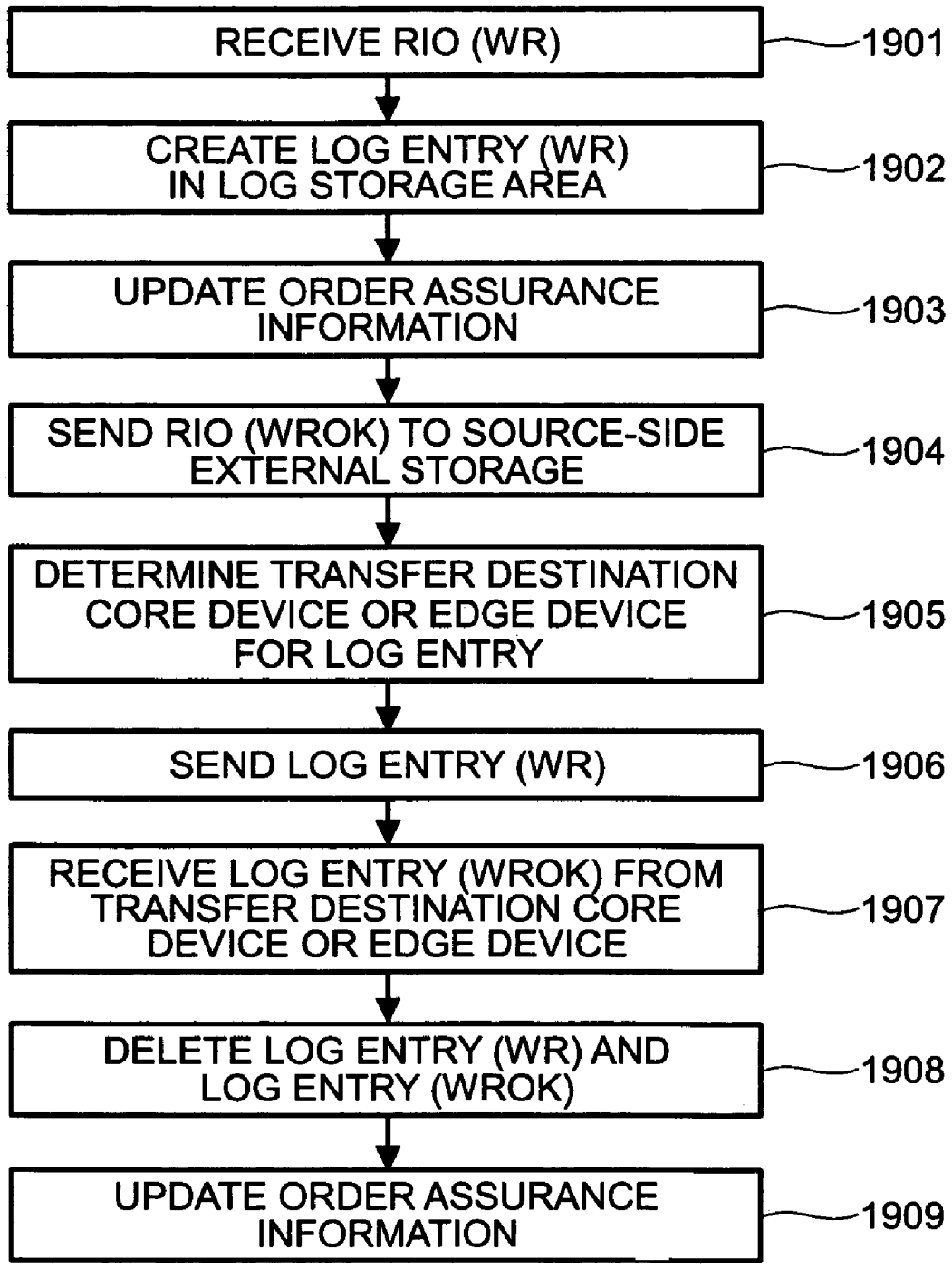
FIG. 19 shows one example of processing of a source-side edge device during normal operation.

FIG. 19 is a flow diagram showing an example of processing of the source-side edge device 104 when writing (WR) to the source volume 113 is performed during normal operation.

(1) The virtual storage provision program 403 receives from the source external storage an FC frame 220 comprising a RIO (WR) having a data written to the source external storage from a host, and passes this to the log entry creation/reflection program 406 (step 1901). The FC frame is received via the RIO protocol stack 402 and FC protocol stack 401. Information passed to the log entry creation/reflection program 406 is the transfer source WWN converted from the transfer source PortID 1411, the transfer destination WWN converted from the transfer destination PortID 1412, and the RIO held in the RIO area 1414.

(2) The log entry creation/reflection program 406 creates a log entry (WR) in the log storage area 413, based on the information passed in step 1901 (step 1902). The values indicated in (A) through (E) below are registered in the log entry (WR).

(A) As the "target storage WWN and LUN" 801, the transfer destination WWN passed in step 1901 and the target LUN for remote copying comprised in the RIO (WR)

(B) As the "source storage WWN and LUN" 802, the transfer source WWN passed in step 1901 and the source LUN 722 obtained by referencing the pair information 411. The source LUN can be obtained by searching for the row in the pair information 411, that has the transfer source WWN as the source storage WWN 721, the target desitination WWN as the target storage WWN 723, and the target LUN for remote copying contained in the RIO (WR) as the target LUN 724, and aquire the source LUN from the searched row.

(C) As the order assurance ID 801, the order assurance ID 726 in the pair information 411 corresponding to the information of (A) and (B) above (D) As the "I/O time and sequential number" 804, the current time of the source-side edge device 104, and the log creation counter value 731 of the order assurance information 412 corresponding to the value of the order assurance ID determined in (C)

(E) As the data stored in the RIO area 805, the RIO (WR) passed in step 1901

(3) Next, the source-side edge device 104 increments by 1 the log creation counter value 731 of the order assurance information 412 used in step 1902 (step 1903).

(4) The virtual storage provision program 403 sends a RIO (WROK) to notify the source external storage 112 of the completion of write processing (step 1904).

(5) Then, the source-side edge device determines the edge device or core device 202 which is to be the transfer destination of the log entry (WR) (step 1905). When the transfer destination is determined, the IP address of the transfer destination is obtained. Determination of the transfer destination and acquisition of the IP address are performed by the procedure indicated in (A) and (B) below.

(A) First, the source-side edge device acquires the transfer source WWN determined in step 1902 and the transit route 713 (list of IP addresses) of the routing information 408 corresponding to the transfer destination WWN.

(B) Next, from the list acquired in (A), the source-side edge device 104 selects the next IP address after its own IP address, and makes this the IP address of the transfer destination.

(6) The log entry transfer program 407 sends the log entry 211 (WR) created in step 1902 to the IP address determined in step 1905 (step 1906). The transfer is executed jointly by the log transfer protocol stack 409 and the IP protocol stack 410.

(7) The log entry transfer program 407 receives the log entry (WROK) from the core device 202 or target-side edge device 105, and saves it to the log storage area 413 (step 1907). The same sequential number 804 as the log entry (WR) sent in step 1906 is present as the sequential number 804 of the log entry (WROK).

(8) The log entry transfer program 407 deletes the log entry (WR) saved in the log storage area 413 and the corresponding log entry 211 (WROK) (step 1908). The correspondence relation between the log entry (WR) and the log entry (WROK) can be ascertained by referencing the correspondence relations between the order assurance IDs and sequential numbers in the log entries (that is, by determining whether the order assurance IDs and sequential numbers coincide).

(9) Beforehand in step 1908, the source-side edge device acquires the order assurance ID 803 and sequential number 804 from the deleted log entry (WR), and increments the log deletion counter value 733 of the corresponding order assurance information 412 (step 1909).

Figure 20:
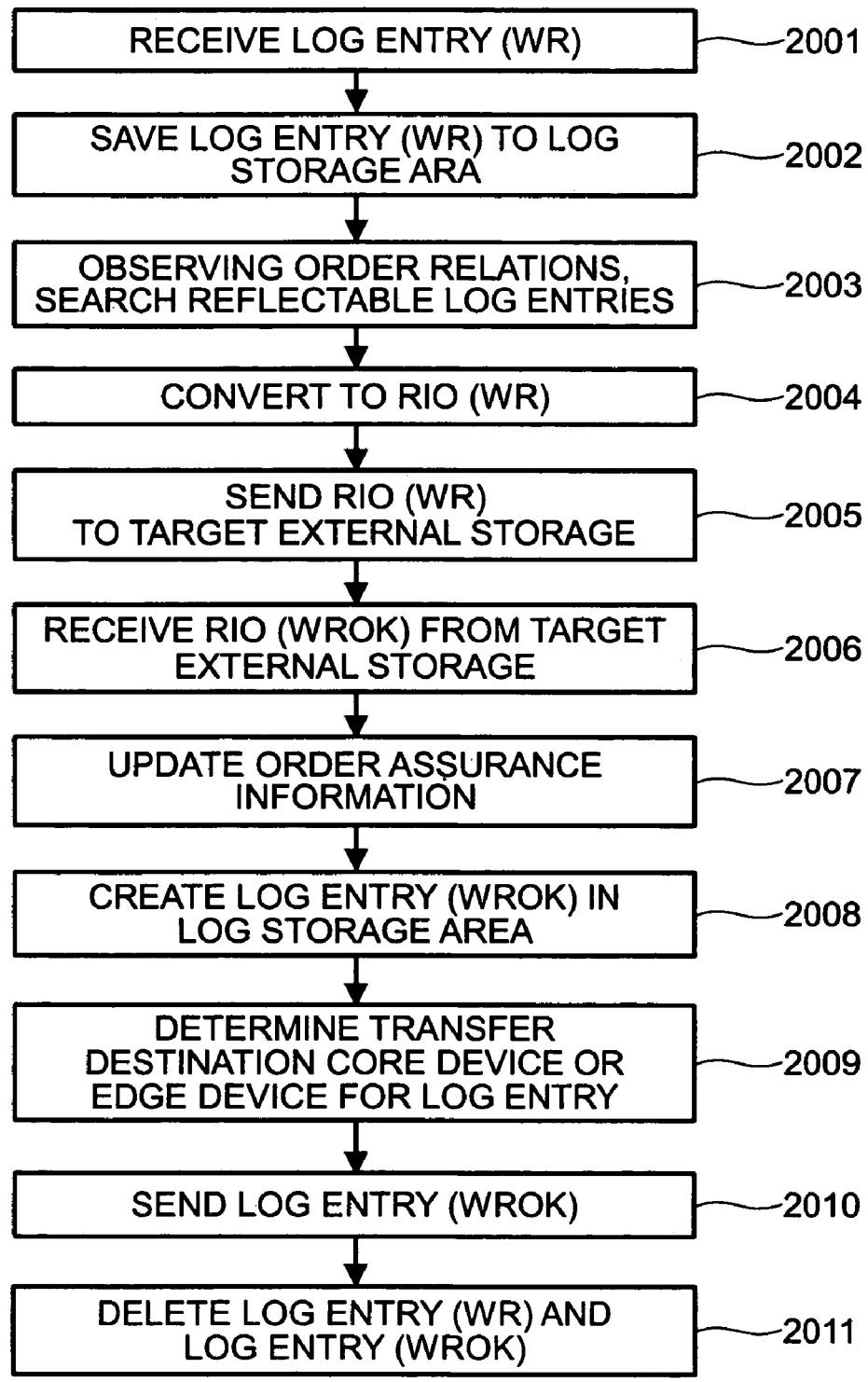
FIG. 20 shows one example of processing of a target-side edge device during normal operation.

FIG. 20 is a flow diagram showing an example of processing of the target-side edge device 105 when writing (WR) from a host to a source volume 113 is performed during normal operation.

(1) The log entry transfer program 407 of the target-side edge device 105 receives a log entry (WR) via the log transfer protocol stack 407 and IP protocol stack 410, and saves this to the log storage area 413 (steps 2001, 2002).

(2) The log entry creation/reflection program 406 seaches the log entries (WR), that is reflectable with keeping sequential number order, from the log storage area 413 (step 2003). Searching is performed for each order assurance ID 731, searching for the log entry (WR) having a sequential number of the same value as the incremented value of the log reflection counter 733 of the order assurance information 413.

(3) The log entry creation/reflection program 406 converts the log entry (WR) retrieved in step 2003 into a RIO (WR) (step 2004). The conversion is performed by extracting the RIO from the RIO area 805 of the log entry.

(4) The virtual storage provision program 403 sends the RIO (WR) converted in step 2004 to the target external storage 122 (step 2005).

(5) The virtual storage provision program 403 receives a RIO (WROK) from the target external storage 122 (step 2006).

(6) The log entry creation/reflection program 406 acquires the order assurance ID 803 and sequential number 804 from the log entry (WR) retrieved in step 2003, and increments the log reflection counter value 733 of the aquired order assurance ID (step 2007). Also, the difference between the current time and the I/O time 804 of the reflected log entry (WR) is registered as the reflection delay time 735 in the order assurance information 413.

(7) The log entry creation/reflection program 406 creates a log entry (WROK) having the received RIO (WROK) in the log storage area 413 (step 2008). The values indicated in (A) through (E) below are registered in the log entry.

(A) As the "target storage WWN and LUN" 801, the "source storage WWN and LUN" 802 of the log entry (WR) selected as a result of the search in step 2003

(B) As the "source storage WWN and LUN" 802, the "target storage WWN and LUN" 801 of the log entry (WR) acquired in step 2003

(C) As the order assurance ID 801, the order assurance ID 801 of the log entry 211 (WR) acquired in step 2003

(D) As the "I/O time and sequential number" 804, the "I/O time and sequential number" 804 of the log entry (WR) acquired in step 2003

(E) As the RIO area 805, the RIO (WROK) received in step 2006

(8) The log entry transfer program 407 references the routing information to determine the core device 202 or source-side edge device 104 to be the transfer destination for the log entry (WROK) (step 2009). Determination of the transfer destination is similar to the above-described step 1905.

(9) The log entry transfer program 407 sends the log entry (WROK) created in step 2008 to the IP address determined in step 2009, via the log transfer protocol stack 409 and IP protocol stack 410 (step 2010).

(10) The log entry creation/reflection program 406 deletes from the log storage area 413 the log entry (WR) selected in step 2003 and the log entry (WROK) created in step 2008 (step 2011).

Figure 17:
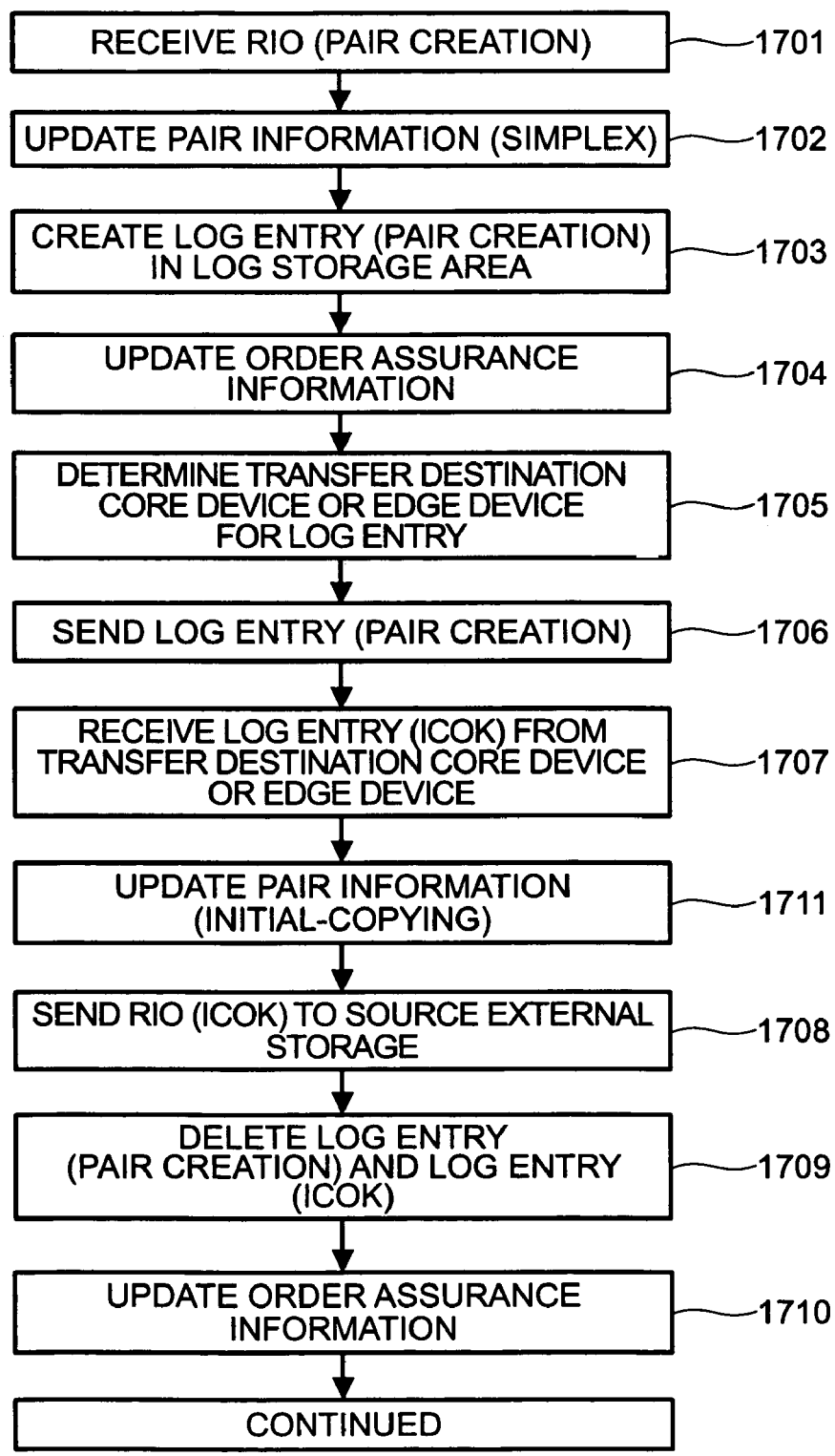
FIG. 17 shows one example of processing of a source-side edge device during pair creation.
Figure 18:
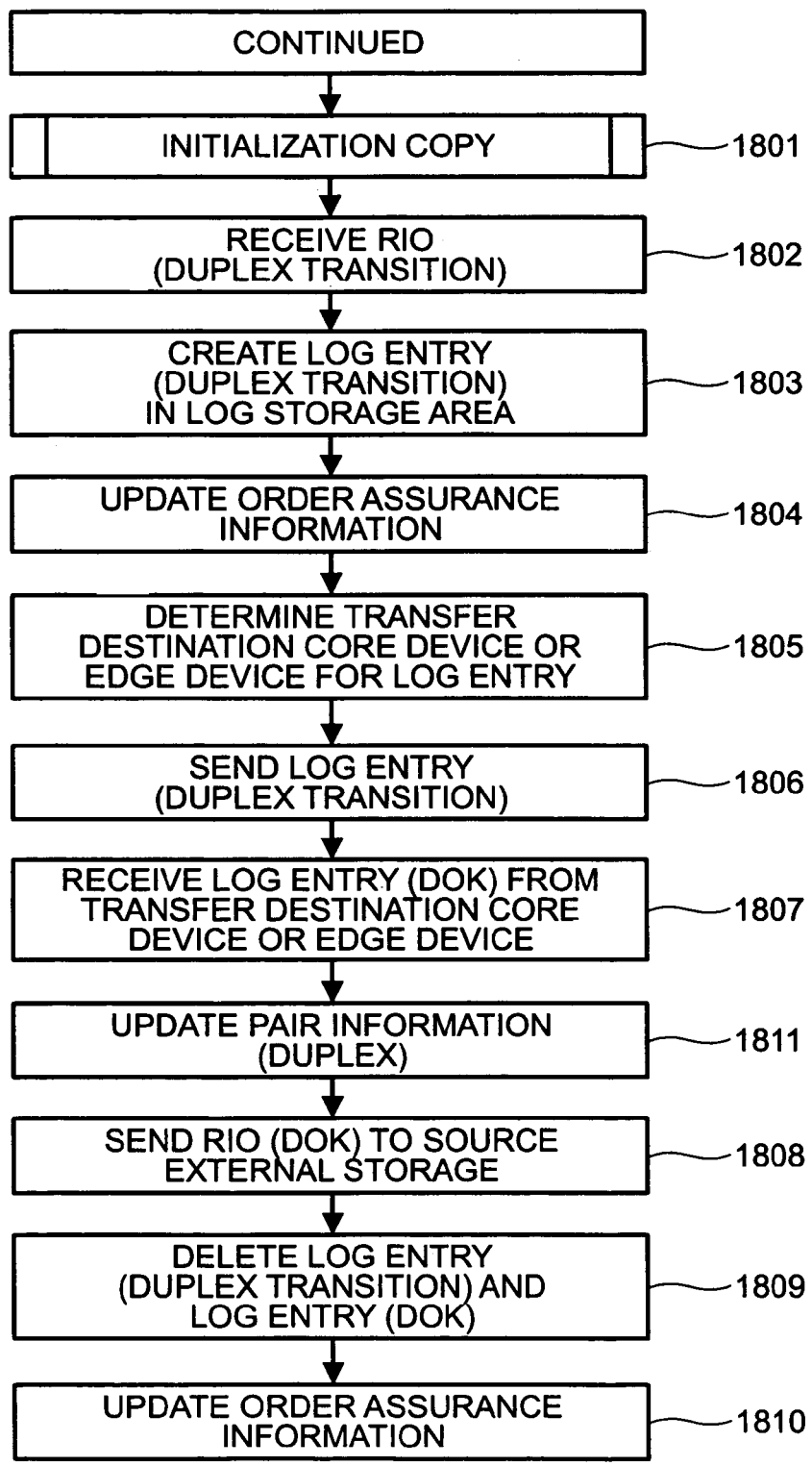
FIG. 18 shows one example of processing of a source-side edge device during pair creation.

FIG. 17 and FIG. 18 show an example of processing by the source-side edge device 104 in pair creation.

(1) The virtual storage provision program 403 receives a RIO (pair creation) (step 1701). The RIO (pair creation) comprises the WWN of the source external storage 112, LUN of the source-side volume 113, WWN of the target external storage 122, and LUN of the target-side volume 123.

(2) Based on the received RIO (pair creation), the virtual storage provision program 403 records source and target information and similar for the pair to be created in the pair information 411 (step 1702). At this time, the pair state 725 is updated to Simplex.

(3) The log entry creation/reflection program 406 creates a log entry (pair creation) having the RIO (pair creation) in the log storage area 413 (step 1703). The method of log entry creation is the same as in step 1902 of FIG. 19.

(4) The log entry creation/reflection program 406 increments the log creation counter value 732 of the order assurance information 412 (step 1704).

(5) The log entry transfer program 407 determines the core device 202 or edge device which is to be the sending destination of the log entry (pair creation) (step 1705). The method of determining the sending destination is the same as in step 1905 of FIG. 19.

(6) The log entry transfer program 407 sends the log entry (pair creation) created in step 1703 to the IP address determined in step 1705 (step 1706).

(7) The log entry transfer program 407 receives a log entry (Initial-Copying transition completed (hereafter "ICOK")) from a core device 202 or edge device 105 (step 1707). This log entry (ICOK) comprises the WWN of the source external storage 112, the LUN of the source-side volume 113, the WWN of the target external storage 122, and the LUN of the target-side volume 123.

(8) The source-side edge device updates the pair state 725 of the corresponding pair in the pair information 411 to Initial-Copying, based on information relating to volume pairs in the received log entry (ICOK) (step 1711).

(9) The virtual storage provision program 403 extracts the RIO (ICOK) from the received log entry (ICOK), and sends this to the source external storage 112 (step 1708).

(10) The log entry creation/reflection program 406 deletes the log entry (ICOK) received in step 1707 and the log entry (pair creation) relating to the same pair as this log entry (ICOK) from the log storage area 413 (step 1709).

(11) The log entry creation/reflection program 406 increments the log deletion counter value 734 of the order assurance information 413 (step 1710).

(12) Then, the source-side edge device 104 starts initialization copy processing (step 1801). The processing of this step is the same as data copying in the normal operation.

(13) The virtual storage provision program 403 receives a RIO (Duplex transition) (step 1802). The RIO (Duplex transition) comprises the WWN of the source external storage 112, the LUN of the source-side volume 113, the WWN of the target external storage 122, and the LUN of the target-side volume 123.

(14) The log entry creation/reflection program 406 creates, in the log storage area 413, a log entry (Duplex transition) from the received RIO (Duplex transition) (step 1803). The method of creation of the log entry 211 is the same as in step 1902 of FIG. 19.

(15) The log entry creation/reflection program 406 increments the log creation counter value 732 of the order assurance information 412 (step 1804).

(16) The log entry transfer program 407 determines the core device 202 or edge device which is to be the transfer destination for the log entry (Duplex transition) (step 1805). The method of determination is the same as in step 1905 of FIG. 19.

(17) The log entry transfer program 407 sends the log entry (Duplex transition) created in step 1803 to the IP address determined in step 1805 (step 1806).

(18) The log entry transfer program 407 receives a log entry (Duplex transition completed (hereafter "DOK")) from the core device 202 or edge device 105 (step 1807). This log entry (DOK) comprises the WWN of the source external storage 112, the LUN of the source-side volume 113, the WWN of the target external storage 122, and the LUN of the target-side volume 123.

(19) The source-side edge device updates the pair state 725 of the pair information 411 corresponding to this volume pair to Duplex, based on information related to the volume pair within the received log entry (DOK) (step 1811).

(20) The virtual storage provision program 403 extracts the RIO (DOK) from the received log entry (DOK), and sends this RIO (DOK) to the source external storage 112 (step 1808).

(21) The log entry creation/reflection program 406 deletes the log entry (DOK) received in step 1807 and the log entry (Duplex transition) relating to the same pair as this log entry (DOK) from the log storage area 413 (step 1809).

(22) The log entry creation/reflection program 406 increments the log deletion counter value 734 of the order assurance information 413 (step 1810).

Figure 21:
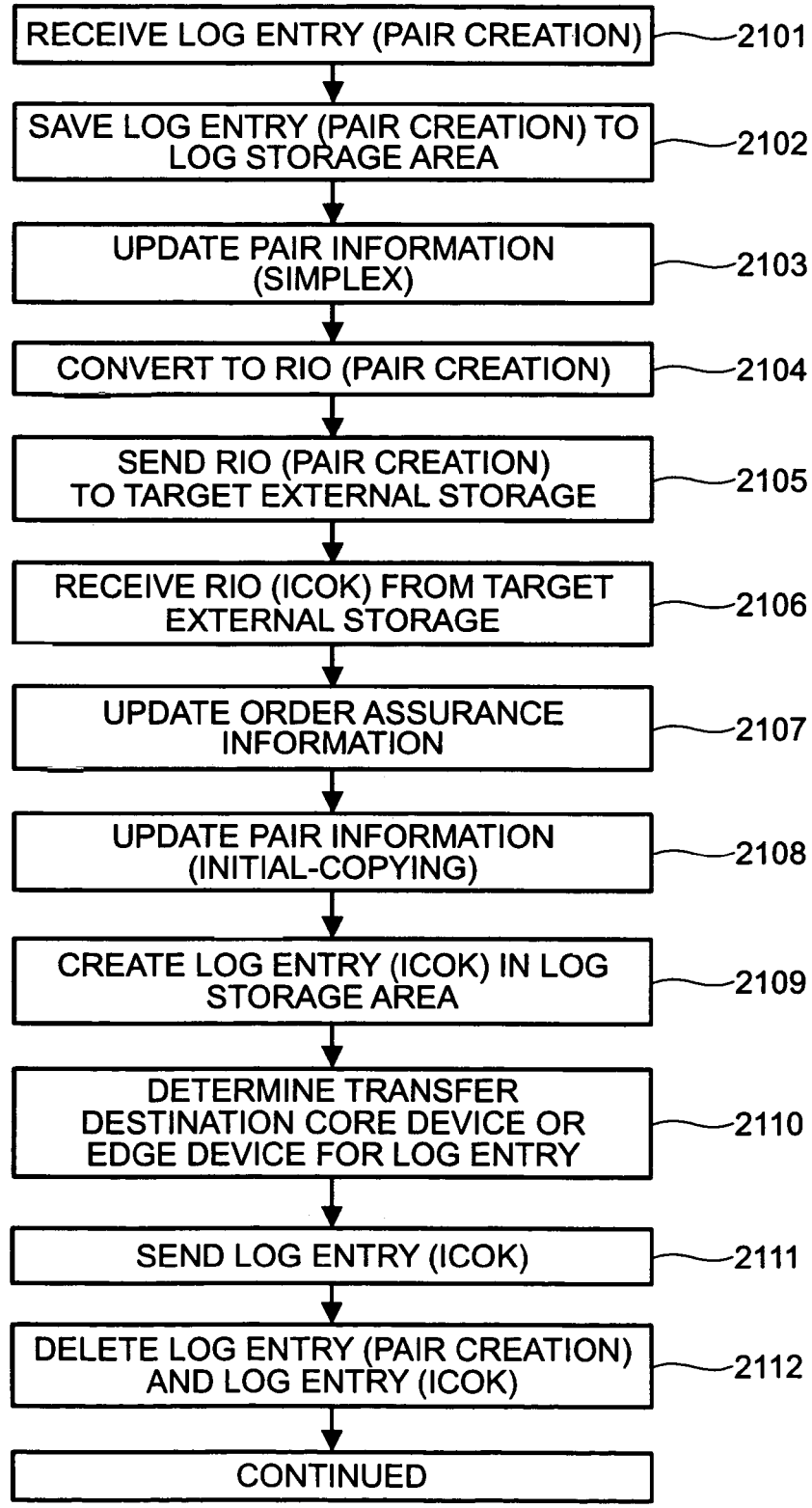
FIG. 21 shows one example of processing of a target-side edge device during pair production; and, FIG. 22 shows one example of processing of a target-side edge device during pair production.
Figure 22:
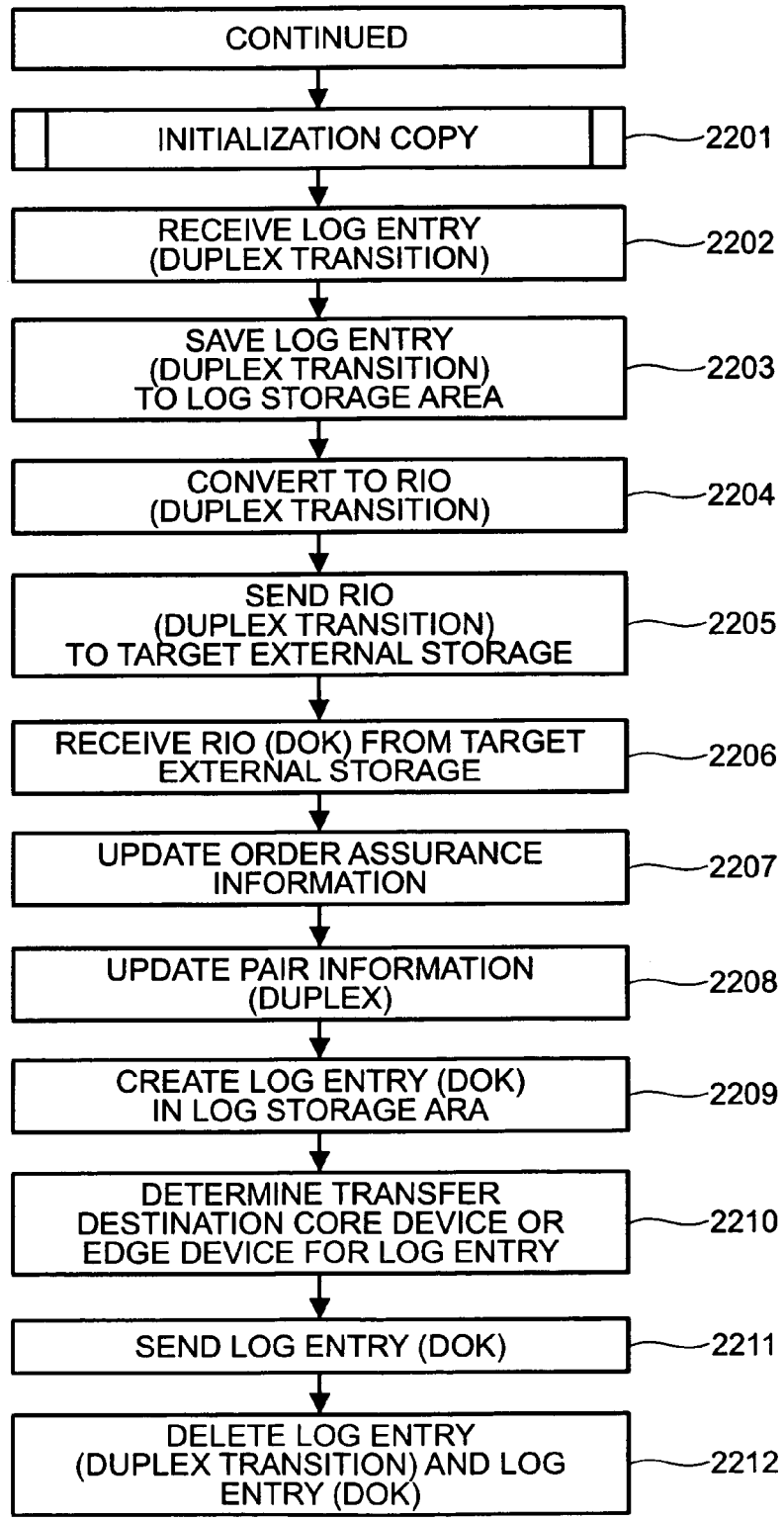

FIG. 21 and FIG. 22 show an example of processing by a target-side edge device 105 during pair creation.

(1) The log entry transfer program 407 receives a log entry (pair creation) (step 2101). This log entry comprises information to identify the pair to be created (that is, the target-side WWN and LUN and the source-side WWN and LUN).

(2) The log entry creation/reflection program 406 stores the received log entry (pair creation) in the log storage area 413 (step 2102).

(3) The virtual storage provision program 403 registers the created pair in the pair information 411, based on the log entry (pair creation) received in step 2102 (step 2103). At this time, the pair state 725 is updated to Simplex.

(4) The log entry creation/reflection program 406 converts the log entry (pair creation) to a RIO (pair creation) (step 2104).

(5) The virtual storage provision program 403 sends the RIO (pair creation) converted in step 2104 to the target external storage 122 (step 2105).

(6) The virtual storage provision program 403 receives a RIO (Initial-Copying transition completed (hereafter "ICOK")) from the target external storage 122 (step 2106). This RIO (ICOK) comprises information to identify the pair.

(7) The log entry creation/reflection program 406 increments the log reflection counter value of the order assurance information 412 corresponding to the pair indicated by the received RIO (ICOK). Also, the difference between the current time and the I/O time 804 of the log entry (pair creation) for the same pair as in the received RIO (ICOK) is registered as the reflection delay time 735 in the order assurance information 413 (step 2107).

(8) The target-side edge device updates the pair state 725 of the pair information 411 for the pair indicated by the received RIO (ICOK) to Initial-Copying (step 2108).

(9) The log entry creation/reflection program 406 creates, in the log storage area 413, a log entry (ICOK) comprising the received RIO (ICOK) (step 2109). The method of creation of the log entry is the same as in step 2008 of FIG. 20.

(10) The log entry transfer program 407 determines the IP address of the core device or edge device which is to be the transfer destination of the log entry (ICOK) (step 2110).

(11) The log entry transfer program 407 sends the log entry created in step 2109 to the IP address determined in step 2110 (step 2111).

(12) The log entry creation/reflection program 406 deletes the log entry (ICOK) created in step 2109 and the log entry (pair creation) for the same pair as this log entry (ICOK) from the log storage area 413 (step 2112).

(13) The target-side edge device performs initialization copying (step 2201). The operation of this step is the same as that of data copying in the normal operation.

(14) The log entry transfer program 407 receives a log entry (Duplex transition) (step 2202).

(15) The log entry creation/reflection program 406 stores the log entry (Duplex transition) in the log storage area 413 (step 2203).

(16) The log entry creation/reflection program 406 converts the log entry (Duplex transition) into a RIO (Duplex transition) (step 2204).

(17) The virtual storage provision program 403 sends the RIO (Duplex transition) converted in step 2204 to the target external storage 122 (step 2205).

(18) The virtual storage provision program 403 receives a RIO (Duplex transition completion (hereafter "DOK")) from the target external storage 122 (step 2206).

(19) The log entry creation/reflection program 406 increments the log reflection counter value of the order assurance information 412 for the volume pair indicated by the received RIO (DOK). Also, the difference between the current time and the I/O time 804 of the log entry (Duplex transition) for the same pair as the received RIO (DOK) is registered as the reflection delay time 735 in the order assurance information 413 (step 2207).

(20) The target-side edge device updates to Duplex the pair state 725 of the pair information 411 for the volume pair indicated by the received RIO (DOK) (step 2208).

(21) The log entry creation/reflection program 406 creates, in the log storage area 413, a log entry (DOK) having the received RIO (DOK) (step 2209).

(22) The log entry transfer program 407 determines the IP address of the core device or edge device which is to be the transfer destination of the log entry 211 (DOK) (step 2210).

(23) The log entry transfer program 407 sends the log entry 211 created in step 2209 to the IP address determined in step 2210 (step 2211).

(24) The log entry creation/reflection program 406 deletes from the log storage area 413 the log entry (DOK) created in step 2209 and the log entry (Duplex transition) for the same pair as this log entry (DOK) (step 2112).

By means of the above aspect, remote copy processing can be executed by relaying data from the source external storage to the target external storage using edge devices and core devices within the RCN, without the source external storage or target external storage being made aware of the existence of edge devices or core devices, but as if recognizing that remote copy processing is being executed directly between the storage devices.

Next, a modified example of the above aspect is explained.

Figure 2:
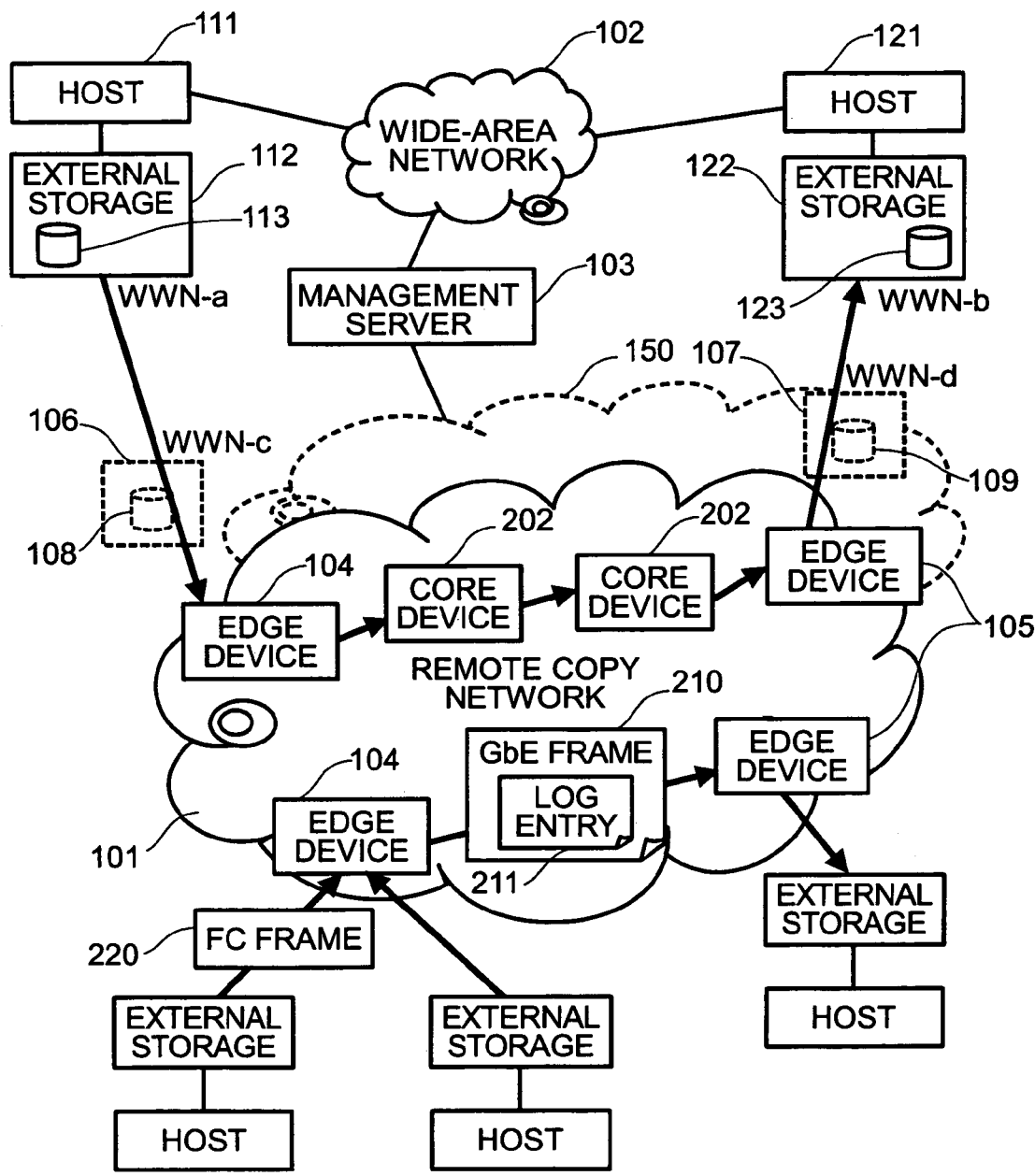
FIG. 2 shows a modified example of an information processing system in which remote copying is executed.

FIG. 2 shows an example of an information processing system of the modified example.

Differences with the first embodiment are the fact that the WWN of the virtual storage 106 differs from the WWN of the external storage 122, and the fact that the WWN of the virtual storage 107 differs from the WWN of the external storage 112.

The RCN configuration program 502 of the management server 103, in addition to the operations in the above aspect, also determines the WWNs of the virtual storage 106 and the virtual storage 107. The determination may be performed within this program, or the values may be determined by receiving information from the edge device 104 or the edge device 105.

The RCN configuration interface program 501, in addition to the operations in the above aspect, also sends the WWN of the virtual storage 106 determined by the RCN configuration program 502 to the host 111 and the WWN of the virtual storage 107 determined by the RCN configuration program 502 to the host 121. Hence, in this modified example, as the information to identify the source volume 113 and virtual volume 108, the WWN of the source external storage and LUN of the source volume, and the WWN of the virtual storage 106 and LUN of the virtual volume 108 (the LUN of the virtual volume 108 is taken to be the same as the LUN of the target volume 123; however, this invention is not limited to the present example) are used, when the host 111 sends a SCSI command for the volume pair of the source volume 113 and target volume 123.

The virtual storage provision program 403 of the edge device, in addition to the operations in the above aspect, also performs the following conversions using the virtual storage information 404 when a RIO is transmitted or received.

(A) When the source-side edge device 104 receives an FC frame, the WWN obtained from the transfer destination PortID 1412 of the FC frame 220 is changed from the WWN of the source-side virtual storage 106 to the WWN of the target-side external storage 122.

(B) When the target-side edge device 105 receives an FC frame, the WWN obtained from the transfer destination PortID 1412 of the FC frame 220 is changed from the WWN of the target-side virtual storage 107 to the WWN of the source-side external storage 112.

(C) When the source-side edge device 104 sends an FC frame, the target storage WWN of the log entry 211 is converted to the source virtual storage WWN, and after conversion the PortID calculated from the source virtual storage WWN is taken to be the transfer source PortID of the FC frame.

(D) When the target-side edge device 105 sends an FC frame, the source storage WWN of the log entry 211 is converted to the target virtual storage WWN, and the PortID calculated from the target virtual storage WWN after conversion is taken to be the transfer source PortID of the FC frame.

As another modified example, connection of the external storage and edge device can be performed using an IP network. In this case, the FC interface 314 is an interface which can be connected with the IP network, and the FC protocol stack 401 becomes the same as the IP protocol stack 410. At this time, a MAC address or IP address is used in place of the WWN in the following information.

(A) Storage connection information 503
(B) Virtual storage information 404
(C) Access control information 405
(D) Routing information 408
(E) Pair information 411
(F) Log entry 211

Further, processes in programs which had performed processing using WWNs perform processing using IP addresses or MAC addresses instead of WWNs.

What is claimed is:

1. A remote copy network system having a first storage system and a second storage system, including a first edge device coupled to the first storage system, a second edge device coupled to the second storage system, the first edge device and the second edge device being coupled by a network, wherein:
   the first edge device receives a remote copy I/O request to copy data to the second storage system from the first storage system;
   the first edge device sends a response to the received remote copy I/O request to the first storage system;
   after sending a response to the remote copy I/O request, the first edge device sends to the second edge device log information having the remote copy I/O request and a sequential number indicating the order of reception of the remote copy I/O request; and
   the second edge device extracts the remote copy I/O request from the received log information, and sends the extracted remote copy I/O request to the second storage system according to the order indicated by the sequential number in the log information.

2. The remote copy network system according to claim 1 wherein:
   the first storage system includes a first volume, the first storage system is identified by first storage identification information and the first volume is identified by first volume identification information;
   the second storage system includes a second volume, the second storage system is identified by second storage identification information and the second volume is identified by second volume identification information;
   first virtual storage identification information having the same value as the second storage identification information and second virtual volume identification information having the same value as the second volume identification information are assigned to the first edge device;
   second virtual storage identification information having the same value as the first storage identification information and second virtual volume identification information having the same value as the first volume identification information are assigned to the second edge device; and
   the first edge device receives a remote copy I/O request from the first storage system, with the first storage identification information and the first volume identification information as the sending source identification information and with the second storage identification information and the second volume identification information as the sending destination identification information, and sends log information having the remote copy I/O request to the second edge device.

3. The remote copy network system according to claim 1 wherein:
   the first storage system comprises a first volume, the first storage system is identified by first storage identification information and the first volume is identified by first volume identification information;
   the second storage system comprises a second volume, the second storage system is identified by second storage identification information and the second volume is identified by second volume identification information;
   first virtual storage identification information and first virtual volume identification information are assigned to the first edge device; and
   the first edge device receives a remote copy I/O request from the first storage system, with the first storage identification information and the first volume identification information as the sending source identification information and with the first virtual storage identification information and the first virtual volume identification information as the sending destination identification information, converts the sending destination into the second storage identification information and the second volume information, and sends log information having the converted I/O request to the second edge device.

4. The remote copy network system according to claim 1 further comprising at least one core device which relays log information sent from the first edge device to the second edge device.

5. The remote copy network system according to claim 4 wherein the first edge device, the second edge device, and the core device are router devices.

6. The remote copy network system according to claim 1 wherein the first edge device stores log information sent to the second edge device, and upon receiving a response to the log information from the second edge device, deletes the stored log information.

7. The remote copy network system according to claim 6 wherein when log information sent to the second edge device is not received by the second edge device, the first edge device resends stored log information to the second edge device.

8. The remote copy network system according to claim 6 further comprising:

a management network coupled to the first edge device and to the second edge device; and a management server coupled to the management network, wherein:

the log information further includes information indicating a time at which the remote copy I/O request from the first edge device was received;

the first edge device, upon receiving a response to the log information from the second edge device, records in memory a delay time calculated by comparing the time information in the log information corresponding to the response and the current time;

the first edge device sends the delay time recorded in the memory to the management server via the management network; and the management server outputs the delay time.

9. The remote copy network system according to claim 1 further comprising:

a third edge device coupled to each of a third storage system and a fourth storage system, wherein:

the first edge device receives a remote copy I/O request for remote copying data from the third storage system to the fourth storage system; and the first edge device distinguishes a remote copy I/O request received from the first storage system and a remote copy I/O request received from the third storage system to perform processing.

10. The remote copy network system according to claim 1 further comprising:

a management network coupled to the first edge device and to the second edge device; and a management server coupled to the management network, and wherein:

the management server receives pair information indicating that the first storage system is a source of remote copying and that the second storage system is a remote copying destination corresponding to the first storage system, and distributes the received pair information, via the management network, to the first edge device and to the second edge device.

11. A relay device, coupled to a first storage system which relays a remote copy of data from the first storage system to a second storage system, comprising:

a first interface coupled to the first storage system;

a second interface coupled to another relay device via a network, wherein the other relay device is coupled to the second storage system;

a processor; and a memory; wherein:

the first interface receives a remote copy I/O request for remote copying data from the first storage system to the second storage system, and returns a response to the remote copy I/O request to the first storage system;

the processor creates and stores in the memory log information having a remote copy I/O request and a sequential number indicating the order of reception of the remote copy I/O request;

the second interface portion, after returning a response to the remote copy I/O request, sends the created log information to the other relay device;

the second interface portion receives a response to the log information; and the processor deletes from the memory the log information corresponding to the received response.

12. The relay device according to claim 11 wherein when the second interface portion does not receive a response to the log information, the second interface portion resends the log information stored in the memory.

13. The relay device according to claim 11 further including a third interface coupled to a management server via a network, wherein:

the log information further comprises information indicating the time at which the first interface portion received the remote copy I/O request; and when the second interface portion receives a response to the log information, the processor calculates the delay time by subtracting the time information in the log information corresponding to the response, from the time at which the response was received; and the third interface portion sends the delay time to the management server.

14. The relay device according to claim 11 further comprising a third interface coupled to a management server, wherein:

first virtual storage identification information and first virtual volume information are assigned to the relay device; and the third interface portion receives, from the management server, pair information taking the first virtual storage identification information and the first virtual volume information to be the sending destination information for remote copying, and taking the first storage identification information which is the first storage system identification information and the first volume identification information which is the first volume identification information of the first storage system to be the sending source information for remote copying.

15. The relay device according to claim 14 wherein:

the first virtual storage identification information has the same value as the second storage identification information, which is the identification information of the second storage device system; and the first virtual volume information has the same value as the second volume identification information, which is the identification information of the second volume of the second storage device system.

16. The relay device according to claim 14 wherein:

a remote copy I/O request received by the first interface portion includes the first storage identification information and the first volume identification information as the sending source information, as well as the first virtual storage information and the first virtual volume information as the sending destination information; and the processor converts the information of the sending destination to the second storage identification information which is the identification information of the second storage system, and converts the second volume identification information which is the identification information of the second volume of the second storage system, and creates log information having the converted remote copy I/O request.

17. A relay device, coupled to a second storage system, wherein the relay device relays remote copy data from a first storage system to the second storage system, comprising:

a first interface portion, coupled to another relay device via a network, wherein the other relay device is coupled to the first storage system;

a second interface, coupled to the second storage system; and a processor, and wherein the first interface portion receives, from the other relay device, log information having a remote copy I/O request for remote copying data from the first storage system to the second storage system and a sequential number indicating the order of reception at the other relay device of the remote copy I/O request;

the processor acquires the remote copy I/O request from the received log information; and, the second interface portion sends the acquired remote copy I/O request, in the order of the sequential number comprised in the log information, to the second storage system.

18. The relay device according to claim 17 further comprising a third interface coupled to a management server, wherein:

second virtual storage identification information and second virtual volume information are assigned to the relay device; and the third interface portion receives, from the management server, pair information taking the second virtual storage identification information and the second virtual volume information to be the sending source information for remote copying, and taking the second storage identification information which is the identification information of the second storage system and second volume identification information which is the identification information of the second volume of the second storage system to be the sending destination information for remote copying.

19. The relay device according to claim 18 wherein:

the second virtual storage identification information has the same value as the first storage identification information which is the identification information of the first storage system; and the second virtual volume identification information has the same value as the first volume identification information which is the identification information of the first volume of the first storage system.

20. The relay device according to claim 18 wherein:

the remote copy I/O request within log information received by the first interface comprises the first storage identification information and the first volume identification information as the sending source information and the second storage information and the second volume information as the sending destination information;

the processor acquires the remote copy I/O request within the received log information and converts the sending source information into the second virtual storage identification information and the second virtual volume identification information; and, the second interface portion sends the converted remote copy I/O request to the second storage system.

* * * * *